United States Patent
Halvorson et al.

(10) Patent No.: US 12,485,989 B2
(45) Date of Patent: Dec. 2, 2025

(54) HEADLIGHT ASSEMBLY

(71) Applicant: Arctic Cat Inc., Thief River Falls, MN (US)

(72) Inventors: Erick Halvorson, Albany, MN (US); Lucas Purcell, Grand Forks, ND (US)

(73) Assignee: Arctic Cat Inc., Thief River Falls, MN (US)

( * ) Notice: Subject to any disclaimer, the term of this patent is extended or adjusted under 35 U.S.C. 154(b) by 417 days.

(21) Appl. No.: 17/900,768

(22) Filed: Aug. 31, 2022

(65) Prior Publication Data
US 2023/0257051 A1    Aug. 17, 2023

Related U.S. Application Data

(60) Provisional application No. 63/310,232, filed on Feb. 15, 2022.

(51) Int. Cl.
*B62J 17/02* (2006.01)
*B62J 6/026* (2020.01)

(52) U.S. Cl.
CPC ............... *B62J 17/02* (2013.01); *B62J 6/026* (2020.02)

(58) Field of Classification Search
CPC .......... B60Q 1/0408–0475; B62M 27/00–028; B62J 17/02–04
See application file for complete search history.

(56) References Cited

U.S. PATENT DOCUMENTS

| | | |
|---|---|---|
| 3,688,856 A | 9/1972 | Boehm et al. |
| 6,799,872 B2 | 10/2004 | Kawai |
| 6,945,593 B2 | 9/2005 | Andre et al. |
| 7,007,998 B2 | 3/2006 | Toyofuku |
| 7,073,928 B2 | 7/2006 | Toyofuku |
| 7,204,355 B2 | 4/2007 | Akiyama et al. |
| 7,357,207 B2 | 4/2008 | Vaisanen |
| 7,367,701 B2 | 5/2008 | Lee |
| D575,194 S | 8/2008 | Hishiki |
| 7,484,584 B1 | 2/2009 | Kerner et al. |

(Continued)

FOREIGN PATENT DOCUMENTS

| | | | | |
|---|---|---|---|---|
| JP | 2002274253 A | * | 9/2002 | ............... B62J 6/02 |
| JP | 2011178243 A | * | 9/2011 | |
| WO | WO-2021199067 A1 | * | 10/2021 | ............... B62J 17/02 |

OTHER PUBLICATIONS

Denis Lavoie, REV Gen5—Ski-Doo new mountain snowmobile platform, 21 pages, https://sledmagazine.com/rev-gen5-ski-doo-new-mountain-snowmobile-platform/, retrieved from internet 2022.

(Continued)

*Primary Examiner* — Mariceli Santiago

(74) *Attorney, Agent, or Firm* — Lowe Graham Jones PLLC

(57) ABSTRACT

In some embodiments, a snowmobile has a body with a headlight assembly that includes a headlight and a cowl. The headlight includes a lens with a center section, and two side sections, wherein one side section includes an extended portion. The cowl is attached to the headlight and covers a portion of the lens. The cowl includes a middle section and two wings extending from the middle section, where the wing, positioned over the one side section with the extended portion, has a notch revealing the extended portion.

12 Claims, 26 Drawing Sheets

(56) References Cited

U.S. PATENT DOCUMENTS

| | | | |
|---|---|---|---|
| D588,719 S | 3/2009 | Longpre et al. | |
| 7,731,263 B2 | 6/2010 | Tanaka | |
| 7,762,367 B2 | 7/2010 | Yamaguchi et al. | |
| 7,766,360 B2 | 8/2010 | Saitou et al. | |
| 7,802,644 B2 | 9/2010 | Brodeur et al. | |
| 7,815,353 B2 | 10/2010 | Aoki | |
| 8,044,532 B2 | 10/2011 | Miyamoto | |
| 8,260,504 B2 | 9/2012 | Tsujii et al. | |
| 8,453,779 B2 | 6/2013 | Vezina | |
| 8,651,221 B2 | 2/2014 | Yagi et al. | |
| 8,912,722 B2 | 12/2014 | Ooba et al. | |
| 8,937,431 B2 | 1/2015 | Ooba et al. | |
| 8,987,991 B2 | 3/2015 | Ikeda et al. | |
| 9,387,907 B2 | 7/2016 | Nasca et al. | |
| 9,545,844 B2 | 1/2017 | Forty et al. | |
| 9,809,195 B2 | 11/2017 | Giese et al. | |
| D808,067 S | 1/2018 | Rius et al. | |
| 10,195,999 B1 | 2/2019 | Glickman et al. | |
| 10,358,187 B2 | 7/2019 | Vistad et al. | |
| D860,488 S | 9/2019 | Cote et al. | |
| D872,354 S | 1/2020 | Cote et al. | |
| 10,543,792 B2 | 1/2020 | Yoshioka et al. | |
| 10,800,458 B2 | 10/2020 | Makowski et al. | |
| D912,283 S | 3/2021 | Fisher | |
| 11,130,439 B2 | 9/2021 | Ben Attouch | |
| 2020/0148056 A1 | 5/2020 | Forty et al. | |
| 2020/0290694 A1* | 9/2020 | Yamasaki | B62J 6/025 |
| 2021/0039558 A1 | 2/2021 | Rucker et al. | |
| 2021/0086840 A1 | 3/2021 | Glickman et al. | |
| 2021/0114525 A1 | 4/2021 | Mazzarella | |
| 2021/0188157 A1 | 6/2021 | Ben Attouch | |
| 2021/0188182 A1 | 6/2021 | Edwards et al. | |
| 2021/0213899 A1 | 7/2021 | Yotsuyanagi et al. | |
| 2021/0237652 A1 | 8/2021 | Mazzarella | |
| 2021/0347432 A1 | 11/2021 | Halvorson | |
| 2022/0009419 A1 | 1/2022 | Kim et al. | |

OTHER PUBLICATIONS

Glove box extension and USB port, Ski-Doo Snowmobiles Forum, 4 pages, https://www.dootalk.com/threads/glove-box-extension-and-usb-port.1567995/, retrieved from internet 2022.

Glovebox for One-Piece Lightweight Hood-Snowmobile Parts & Accessories—Ski-Doo, 2 pages, https://shop.ski-doo.com/us/en/860202193-glovebox-for-one-piece-lightweight-hood.html, retrieved from internet 2022.

One-Piece G4 Lightweight Hood, 3 pages, https://www.brppac.com/brp-860202087.html, retrieved from internet 2022.

Skinz Flat Black Helium Lightweight Hood Kit—SDHK450-BK—Dennis Kirk, 4 pages, https://www.denniskirk.com/skinz/flat-black-helium-lightweight-hood-kit-sdhk450-bk.p398692.prd/398692.sku, retrieved from internet 2022.

Front Bumper—Arctic Cat Mountain Cat 1M| Alberta Motorsports Sales & Salvage Ltd, 3 pages, https://abmotorsports.ca/products/front-bumper-1606-949, retrieved from internet 2022.

Airbox with Integrated Storage and Air Intakes, Infringement and Patentability Search, Apr. 7, 2022, 13 pages, Kramer IP Search, Alexandria, VA.

Composite Front Bumper Mount for Snowmobile, Infringement and Patentability Search, May 6, 2022, 10 pages, Kramer IP Search, Alexandria, VA.

* cited by examiner

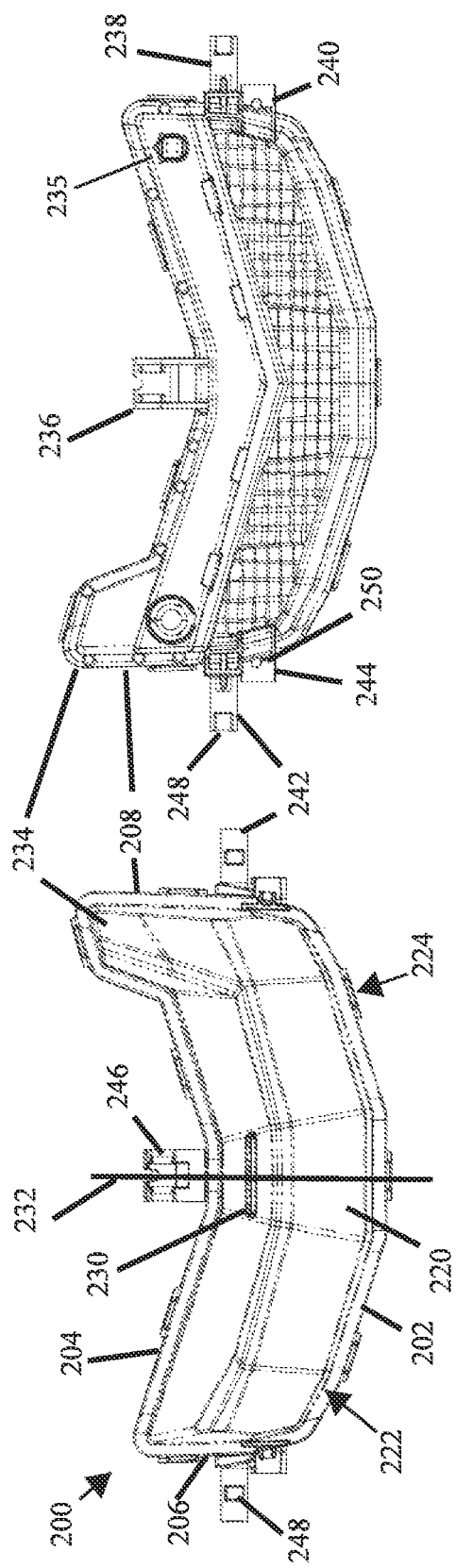
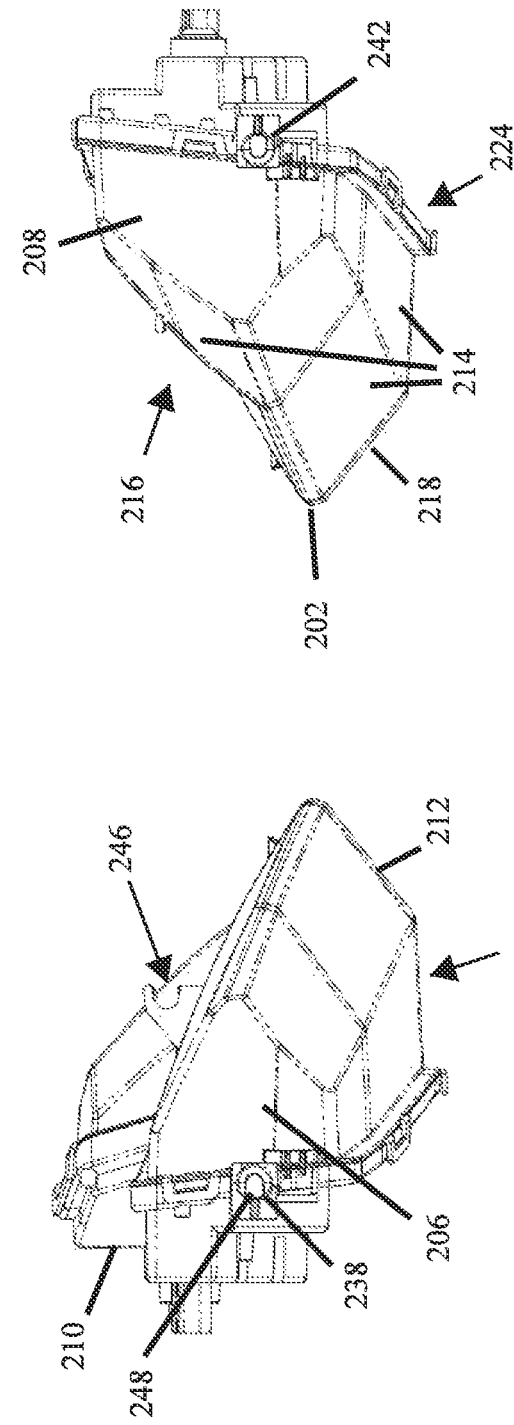
FIG. 2A
FIG. 2B
FIG. 2C
FIG. 2D

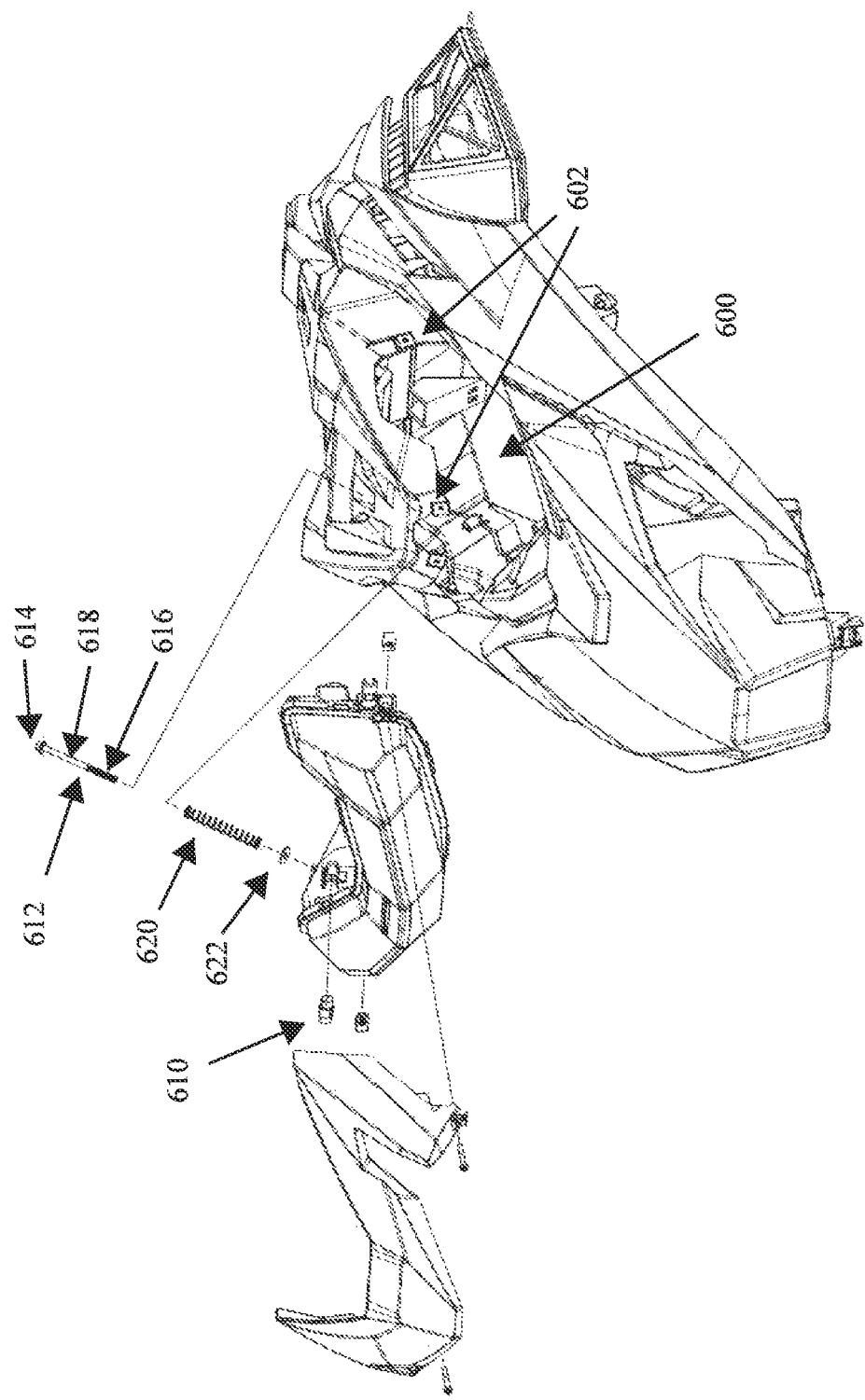

HEADLIGHT ASSEMBLY

RELATED APPLICATION

This application claims the benefit of U.S. Provisional Application Ser. No. 63/310,232 filed Feb. 15, 2022, and entitled HEADLIGHT ASSEMBLY, which is hereby incorporated herein by reference in its entirety.

FIELD OF THE DISCLOSURE

This application relates to a headlight assembly for a vehicle and, more particularly, an adjustable headlight assembly for a snowmobile or other off-highway vehicle.

BACKGROUND

Snowmobiles are popular land vehicles used for transportation or recreation in cold and snowy conditions. Generally, snowmobiles are available for various applications such as deep snow, high performance, luxury touring, and trail riding, for example. In general, a snowmobile has a chassis on or around which the various components of the snowmobile are assembled. Typical snowmobiles include one or more skis for steering, a seat, handlebars, and an endless track for propulsion mounted to a central chassis. The engine drives a ground-engaging endless track, which is disposed in a longitudinally extending drive tunnel. One or more skis serve to facilitate steering as well as to provide flotation of the front of the snowmobile over the snow in which it is operated. A handlebar assembly, positioned forward of the seat, is operatively linked to the skis for steering the snowmobile. The skis may be pivoted to steer the snowmobile, for example, by turning the handlebars.

Headlights are normally used with trail and off-trail snowmobiles that are not used for closed course competition. Depending on the use of the snowmobile, including the load, the user may wish to adjust the aim of the snowmobile headlight beyond simply switching between high and low beam setting. The user needs a convenient and reliable adjustment system as well as a system that allows a large range of adjustability.

SUMMARY

In some embodiments, a headlight assembly includes a headlight comprising a slot and a cowl comprising a tab positioned in the slot. The cowl covers an upper portion of the headlight.

Embodiments further include a snowmobile with a body with a headlight assembly that includes a headlight and a cowl. The headlight includes a lens with a center section and two side sections, wherein one side section includes an extended portion. The cowl is attached to the headlight and covers a portion of the lens. The cowl includes a middle section and two wings extending from the middle section, where the wing positioned over the one side section with the extended portion has a notch revealing the extended portion.

Embodiments include an adjustment mechanism for a headlight assembly of a snowmobile. The adjustment mechanism includes a barrel nut positioned on a threaded end portion of a screw and held by a cradle of the headlight assembly and a spring positioned around the screw between the barrel nut and the head of the screw. Modifying tension in the spring by turning the screw moves the headlight assembly.

BRIEF DESCRIPTION OF DRAWINGS

This written disclosure describes illustrative embodiments that are non-limiting and non-exhaustive. Reference is made to illustrative embodiments that are depicted in the figures, in which:

FIGS. 2A-D are views of the front, back, right side and left side respectively of a headlight for the headlight assembly, according to some embodiments.

FIG. 4A is a top isometric view and FIG. 4B is a bottom isometric view.

FIG. 6 is an exploded view showing an opening configured to receive a headlight assembly, attachment locations for a windshield, and an attachment/adjustment mechanism for a headlight assembly, according to some embodiments.

FIG. 8A is a view of the windshield and the headlight assembly without the cowl and FIG. 8B is a view of FIG. 8A with the cowl.

FIG. 14A illustrates a down position, FIG. 14B illustrates a middle/neutral position, and FIG. 14C illustrates an upper position, according to some embodiments.

FIG. 16A illustrates a down position, FIG. 16B illustrates a middle/neutral position, and FIG. 16C illustrates an upper position, according to some embodiments.

DETAILED DESCRIPTION

Embodiments of the present disclosure describe a cowl, a headlight, and a headlight assembly. An advantage of the headlight assembly disclosed herein is that it may be adjusted to a greater extent than a typical headlight assembly. For example, the headlight assembly may be adjusted to ±7° relative to a normal position (0°). In one aspect, a three-point adjustment mechanism adjusts the headlight assembly relative to a normal position.

Figure 1:
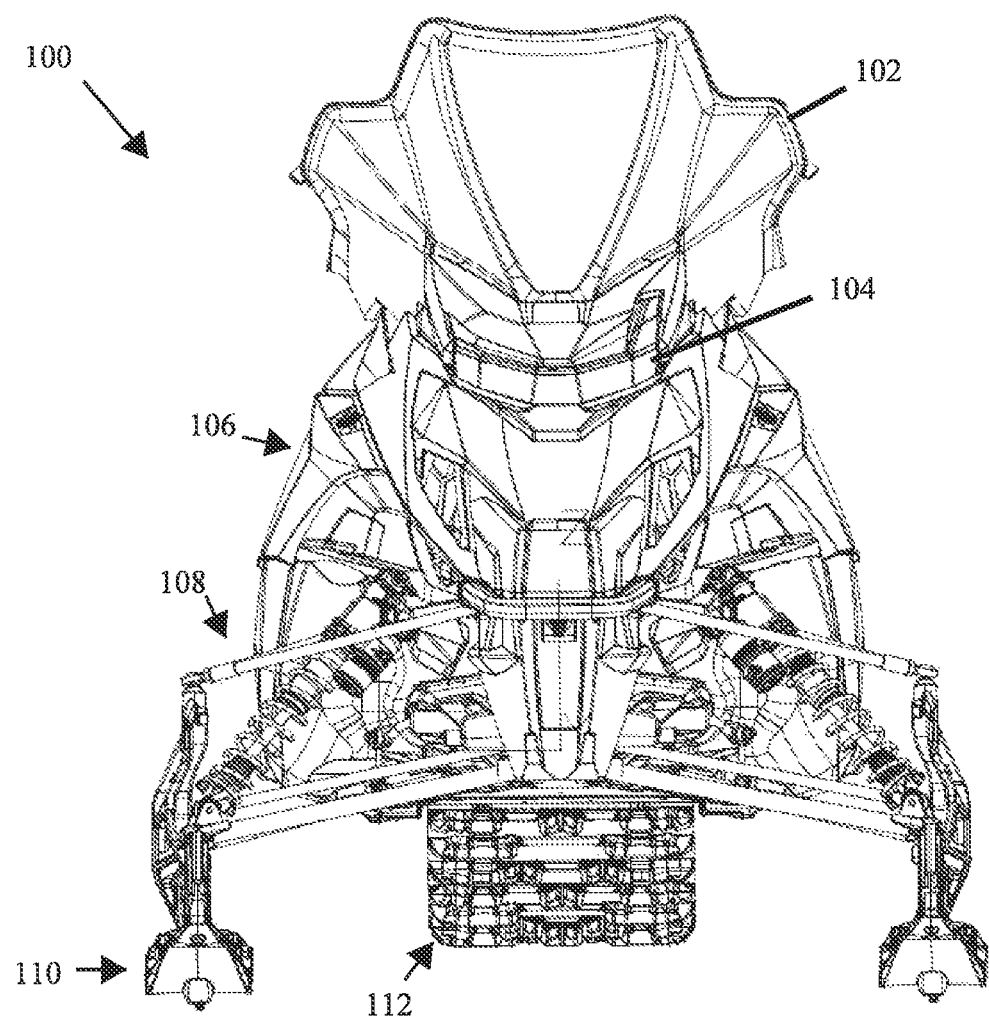
FIG. 1 is a front view of a snowmobile with a headlight assembly, according to some embodiments.

FIG. 1 is a front view of a snowmobile 100. In at least one embodiment, the snowmobile 100 has a windshield 102, a headlight assembly 104, a body 106, a front suspension 108 attached to skis 110, and an endless track 112.

In at least one embodiment, the headlight assembly 104 includes a headlight 200. FIGS. 2A-E are views of a headlight 200, according to some embodiments. Headlight 200 may be made of a material that is substantially rigid and/or does not substantially flex. In one example, headlight 200 is made of a plastic material. Headlight 200 includes a leading edge 202, a trailing edge 204, and two side edges 206, 208 (see e.g., FIG. 2A). In at least one embodiment, the leading edge 202 and/or the trailing edge 204 is curvilinear.

The headlight 200 includes a housing 210 and a lens 212 connected to the housing (see e.g., FIG. 2C). In some embodiments, the lens 212 forms the face/front of the headlight 200, and the housing 210 forms the back of the headlight 200. The lens 212 includes a plurality of mirrors or mirrored surfaces located within the lens to direct light outwards (not shown). In at least one embodiment, the lens 212 has a plurality of facets or faces 214, an upper portion 216, a lower portion 218, a center section 220, a first side section 222, and/or a second side section 224. The side sections 222, 224 along with the housing 210 form the sides 226, 228 of the headlight 200. (see side 226 in FIG. 2C and side 228 in FIG. 2D).

In some embodiments, the upper portion 216 and the bottom portion 218 extend rearward from the leading edge 202 (see e.g., FIGS. 2A and D). In one example, the lens 212 has a V-shaped cross-section with the leading edge 202 forming the apex of the V. In one example, the bottom portion 218 has more faces/facets 214 than the upper portion 216 (see e.g., FIG. 2A). In some embodiments, the center section 220 includes a slot 230. Slot 230 may be a through hole or a blind hole. In one example, the upper portion 216 of the center section 220 has a blind hole slot 230. In further embodiments, slot 230 is located in the upper portion 216 of the lens 212.

In at least one embodiment, the headlight 200 is asymmetric about a line 232 bisecting the headlight 200 (see e.g., FIG. 2A). In other words, the halves of the headlight 200 are not mirror images. In some embodiments, one of the side sections 222, 224 has an extended portion 234. The extended portion 234 may have any shape. One example is a generally rectangular shape where the extended portion 234 has a greater longitudinal extent than the rest of the side section. In one embodiment, the headlight 200 has a L shape with the extended portion 234 positioned generally perpendicular to a long axis, e.g., an axis perpendicular to line 232. Extended portion 234 preferably includes an accent light therein.

In at least one embodiment, the housing 210 includes an electrical connector 235, a cradle 236, a first pivot shaft 238, a first attachment tab 240, a second pivot shaft 242, and a second attachment tab 244 (see e.g., FIG. 2B). In some embodiments, the electrical connector 235 provides power to the headlight 200 (see also, FIG. 4B). In some embodiments, cradle 236 includes a semi-circular receptacle 246 (see e.g., FIGS. 2A and 2C). In one embodiment, cradle 236 is attached to the back side of the housing 210. In one example, cradle 236 is positioned behind slot 230, which is located in the center section 220 of the lens 212 (see e.g., FIG. 2A).

Figure 2E:
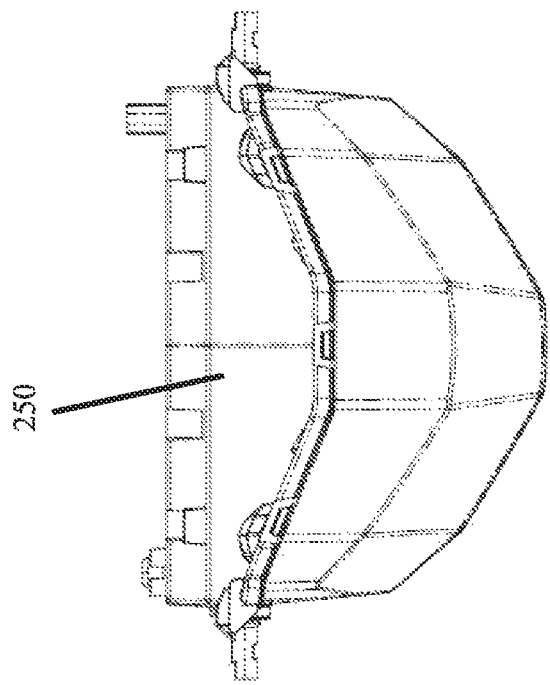
FIGS. 2E-F are views of the top and bottom respectively of the headlight of FIGS. 2A-F further including a rearward extending panel, according to some embodiments.
Figure 2F:
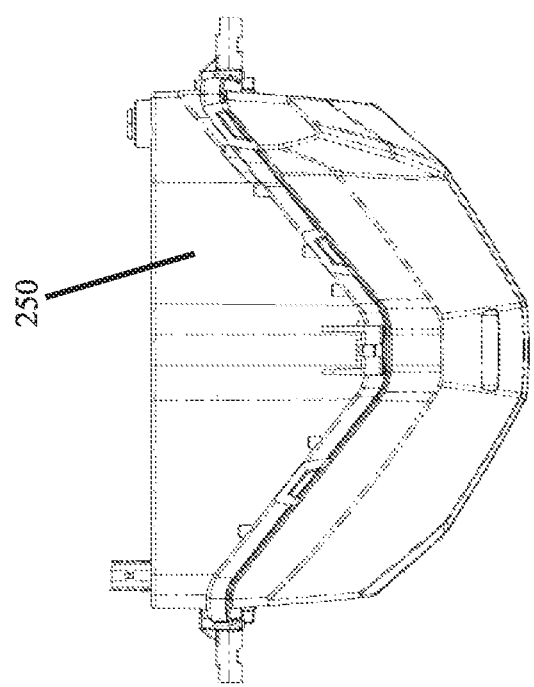

In some embodiments, a pivot shaft 238, 242 is attached to both sides 226, 228 of the housing 210. In one example, the pivot shaft 238, 242 has at least one cutout 248 (see e.g., FIGS. 2A-C). In some embodiments, an attachment tab 240, 244 is positioned adjacent to the pivot shaft 238, 242. In one example, an attachment tab 240, 244 is positioned forward of each pivot shaft 238, 242 (see e.g., FIG. 2A). In a further embodiment, the attachment tab 240, 244 has a through hole 250. In one example, the attachment tab 240, 244 has a single through hole 250 (see e.g., FIG. 2B). In at least one embodiment, a portion of the housing 210 underneath the mirrors is irregularly shaped (see e.g., FIGS. 2B and 4E). In at least one embodiment, the housing 210 further includes a panel/plenum 250 extending rearward (see e.g., FIGS. 2E-F).

In at least one embodiment, the headlight assembly 104 further includes a cowl or trim piece 300. FIGS. 3A-D are views of a cowl or trim piece 300 for a headlight assembly 104, according to some embodiments. The cowl 300 reduces or completely covers the gap between the headlight 200 and body 106 of the snowmobile even while the headlight assembly is adjusted to its extremes. The cowl 300 may be made of a material that can flex. Thus, cowl 300 is more flexible (i.e., less rigid) than the headlight 200. In one example, the cowl 300 is made of a plastic material. In some embodiments, the cowl 300 is a unitary piece. The flex of the cowl is important to enable the cowl to flex as it contacts a portion of the body 106 of the snowmobile at various adjustment positions of the headlight, as the cowl moves with the headlight during adjustment. The headlight assembly, including the headlight and the cowl move relative to the snowmobile body 106 during adjustment. Thus, the cowl may contact and elastically flex as it presses against the windshield (if present) or hood (if windshield is not present) when the headlight assembly 104 is rotated all the way up. This helps maintain a smaller gap (or no gap) between the cowl and windshield or cowl and hood when the headlight is pivoted all the way down.

Figure 3A:
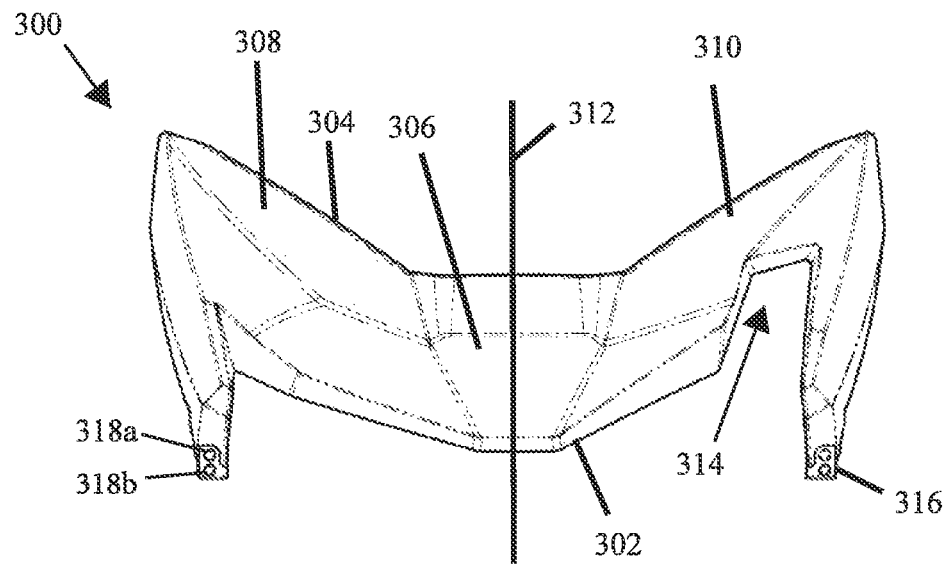
FIGS. 3A-D are views of the front, left side, top, and bottom respectively of a cowl/trim piece for the headlight assembly, according to some embodiments.

In at least one embodiment, the cowl 300 has a leading edge 302, a trailing edge 304, and includes a middle section 306 and two wings 308, 310 (see e.g., FIG. 3A). In one embodiment, the leading and trailing edges 302, 304 of the middle section 306 are straight, and the leading and trailing edges 302, 304 of each wing 308, 310 have a plurality of straight sections. In some embodiments, the leading edge 302 of each wing 308, 310 extends backward from the leading edge 302 of the middle section 306, and/or the trailing edge 304 of each wing 308, 310 extends backwards from the trailing edge 304 of the middle section 306 (see e.g., FIGS. 3B-4A). In other embodiments, the cowl 300 has a V shape where the wings 308, 310 form the legs of the V and the middle section forms the apex/bottom of the V (see e.g., FIG. 3C). In some embodiments, the cowl 300 is asymmetric about line 312 bisecting the cowl (see e.g., FIG. 3A). In other words, the halves of the cowl 300 are not mirror images of each other. In one embodiment, the wings 308, 310 are not mirror images. In a further embodiment, one wing 308, 310 has a recess or notch 314. The edges of notch 314 may be straight, curved, and/or curvilinear. In one example, notch 314 has a length greater than its width, e.g., a rectangular shape (see e.g., FIGS. 3A and C).

Figure 3B:
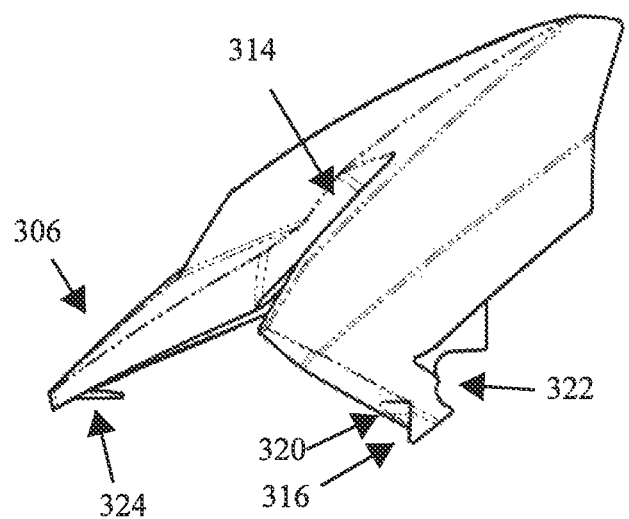
Figure 3C:
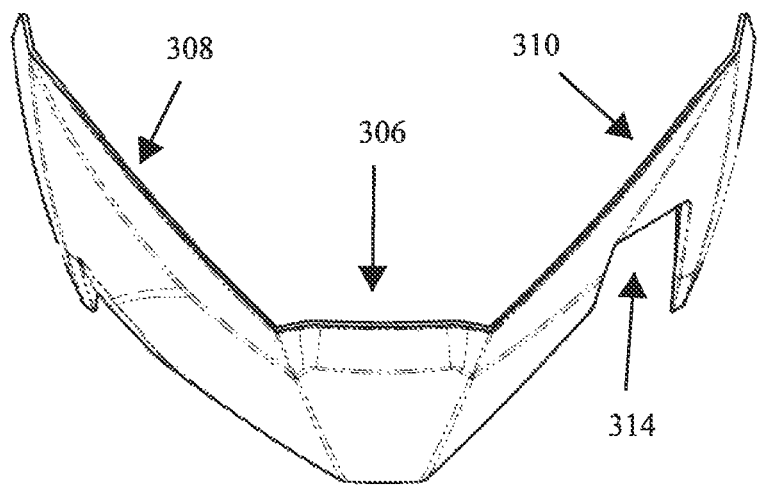
Figure 3D:
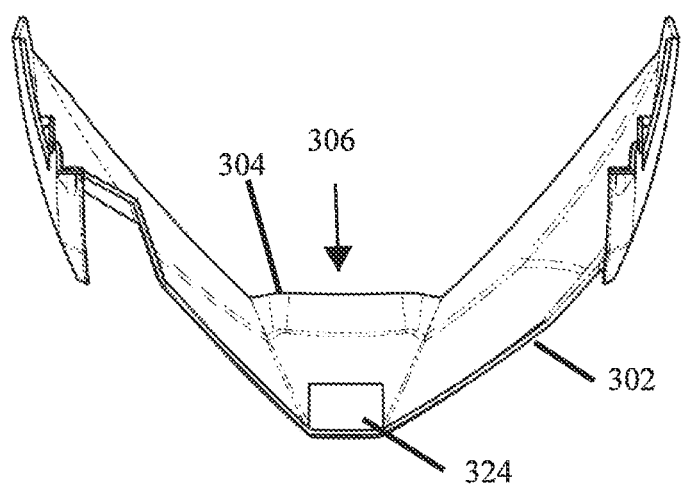

In at least one embodiment, a portion of each wing 308, 310 extends downward to form sides of the cowl 300 (see e.g., FIGS. 3A-B). In some embodiments, each wing 308, 310 includes an attachment mount 316. In one example, the attachment mount 316 is positioned on a front face of the side formed by the wing 308, 310. In one embodiment, the attachment mount 316 has at least one hole 318 (see e.g., FIG. 3A). In one example, the attachment mount 316 has two through holes 318a, 318b. In further embodiments, there is a recess 320 adjacent to at least one of the two through holes 318a, 318b of the attachment mount 316 (see e.g., FIG. 3B). In additional embodiments, each wing 308, 310 includes a recess 322 configured to receive a pivot shaft 238, 242. In one example, each recess 322 is curved. In some embodiments, there are recesses 322 positioned side by side in a vertical direction (see also FIGS. 12A-B and 13A-B). In some embodiments, the cowl 300 includes a tab 324. In one example, tab 324 is positioned underneath, and connected to, the middle section 306, and extends rearward (see e.g., FIG. 3D).

Figure 4A:
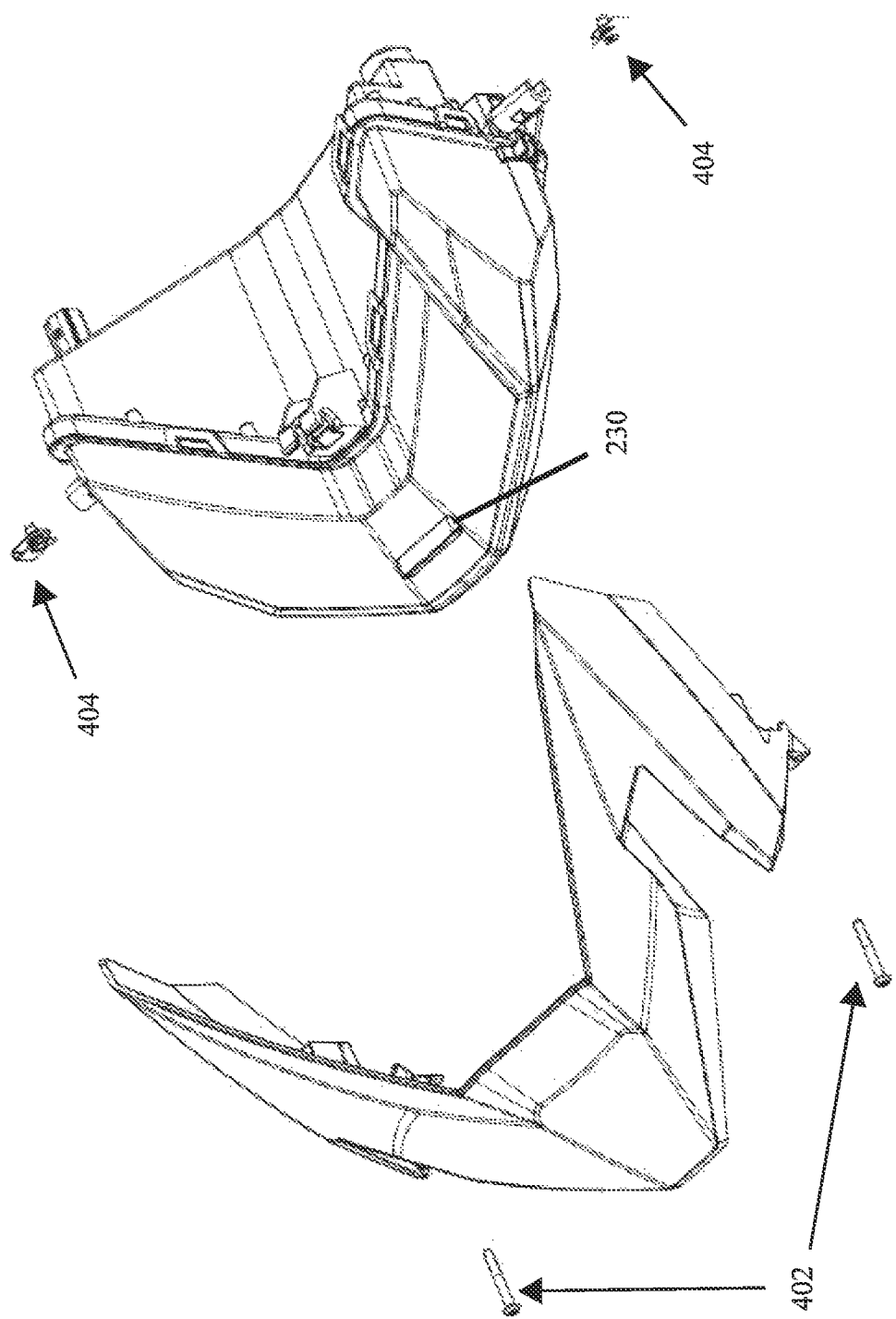
FIGS. 4A-B are exploded views illustrating the attachment of the headlight and cowl to form a headlight assembly, according to some embodiments.
Figure 4B:
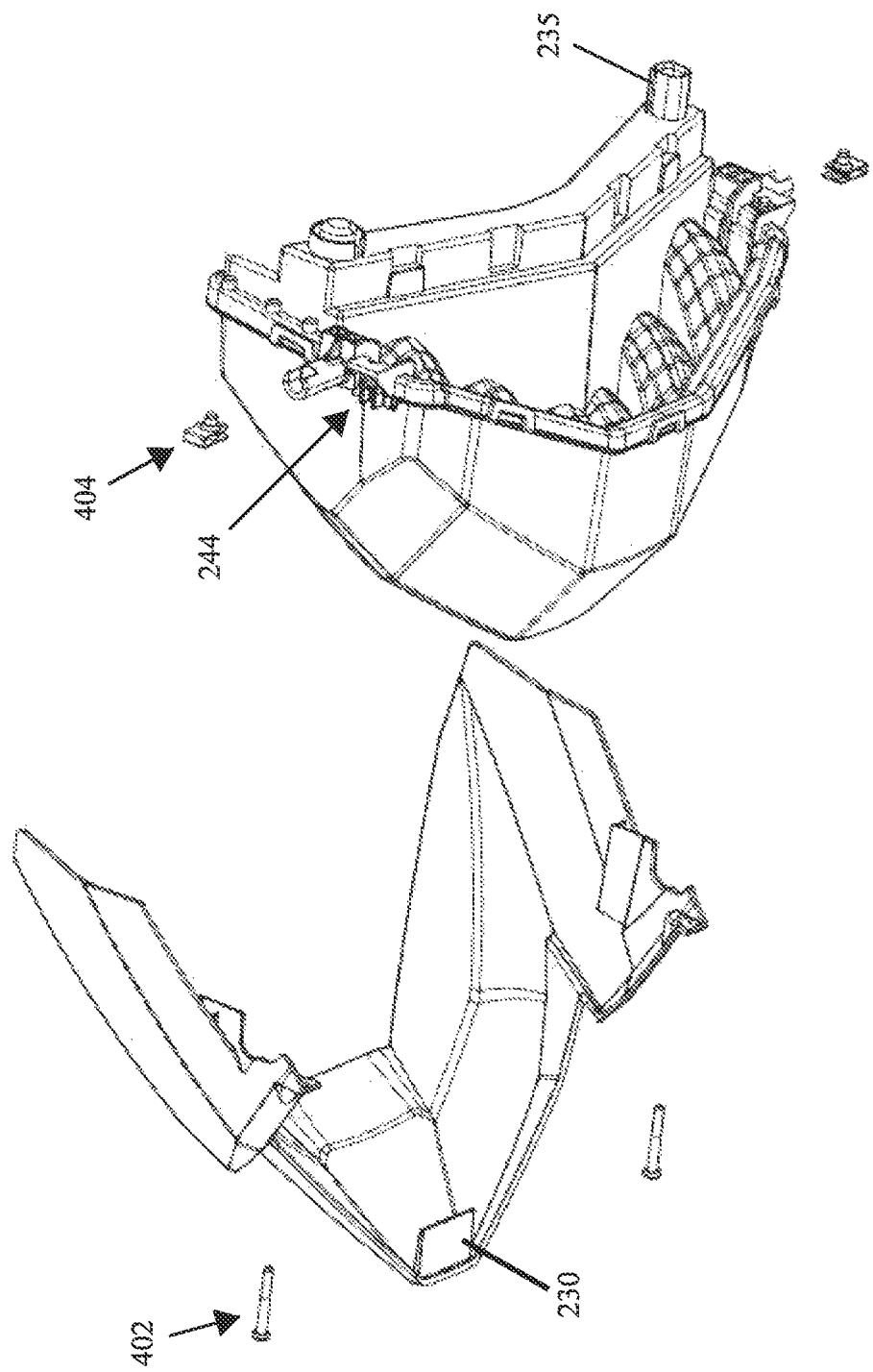

FIGS. 4A-B are exploded views that illustrate the attachment of the headlight 200 and cowl 300 to form the headlight assembly 104. In at least one embodiment, there are two attachment mechanisms configured to connect the headlight 200 and cowl 300 thereby forming a headlight assembly 104. In some embodiments, a first attachment mechanism includes tab 324 and slot 230. The first mechanism attaches the cowl 300 and headlight 200 by inserting tab 324 into slot 230. In some embodiments, a second attachment mechanism includes the attachment mount 316, the attachment tab 240, 244, a screw 402, and a clip nut 404 (see e.g., FIG. 4A). In at least one embodiment, the attachment mount 316 of the cowl 300 is aligned with the attachment tab 240, 244 of the headlight 200. In some embodiments, the clip nut 404 includes a threaded hole and is configured to be placed over the attachment tab 240, 244 of the headlight 200. To attach the cowl 300 and headlight 200 using the first attachment mechanism, a clip nut 404 is aligned with the hole 250 of the attachment tab 240, 244, screw 402 is inserted into a hole 318a, 318b of the attachment mount 316 of the cowl 300 so that it extends through the clip nut 404 and the hole 250 of the attachment tab 240, 244 of the headlight 200. In some embodiments, recess 320 is sized to accommodate the head of screw 402.

FIGS. 5A-E are views of the headlight assembly 104. In at least one embodiment, the headlight assembly 104 is asymmetric about line 500 bisecting the headlight assembly 104 (see e.g., FIG. 5A). In other words, although the outer perimeter shape of the cowl is symmetric about bisecting line 500, the asymmetric cowl 300 results in halves that are not mirror images.

Figure 5A:
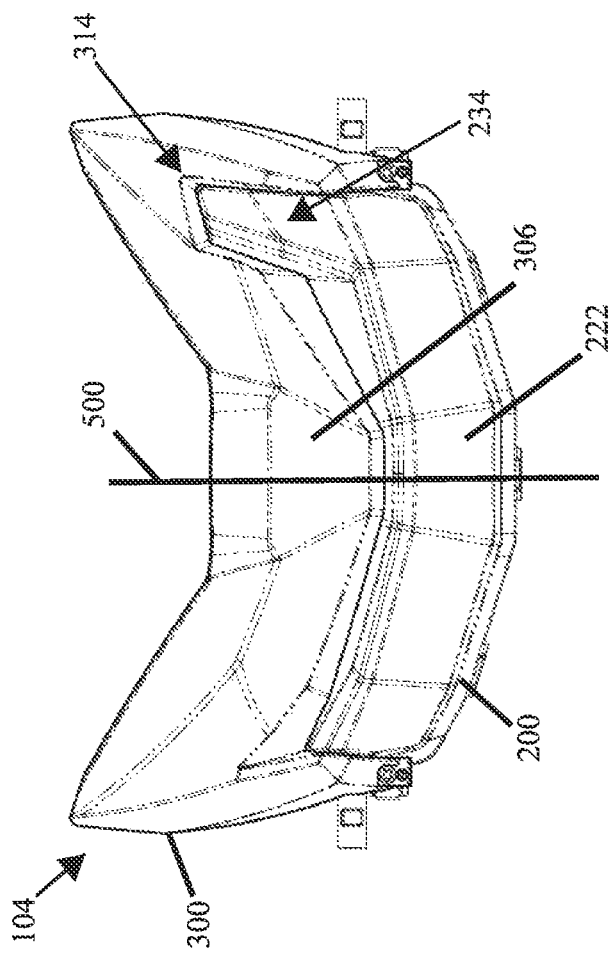
FIGS. 5A-E are views of the front, a first side, a second side, top, and bottom respectively of a headlight assembly, according to some embodiments.
Figure 5C:
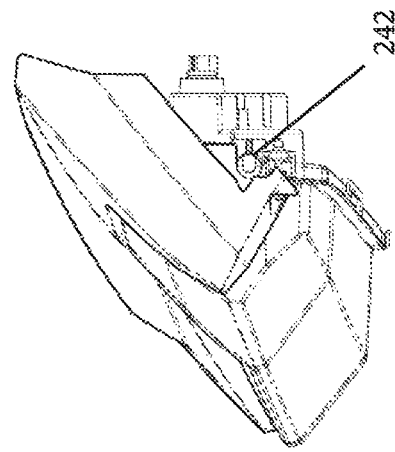
Figure 5B:
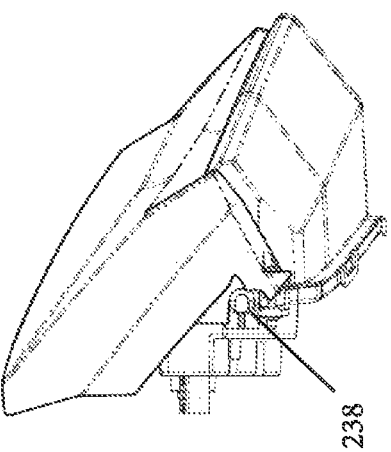
Figure 5D:
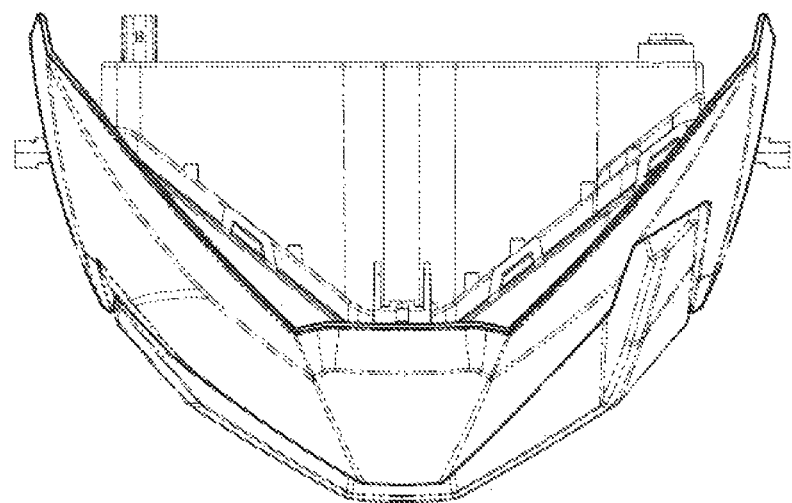
Figure 5E:
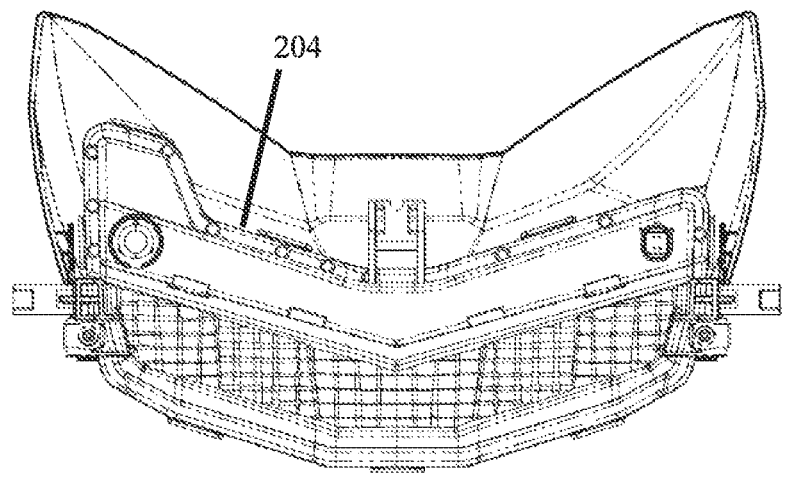

In some embodiments, the cowl 300 extends over/covers the upper portion of the headlight 200 (see e.g., FIGS. 5A-B). In further embodiments, the wings 308, 301 of the cowl 300 cover the side of the headlight. In some embodiments, notch 314 of the cowl 300 is aligned with the extended portion 234 (see e.g., FIG. 5A). In some embodiments, the middle section 306 of the cowl 300 is aligned with the center section 222 of the headlight 200. In further embodiments, the cowl 300 extends rearward from the trailing edge 204 of the headlight 200 (see e.g., FIG. 5E). In further embodiments, the pivot shaft 238, 242 of the headlight abuts the curved recess 322 of the cowl 30) (see e.g., FIGS. 5B-C, see also FIGS. 12A and 13A).

Figure 7A:
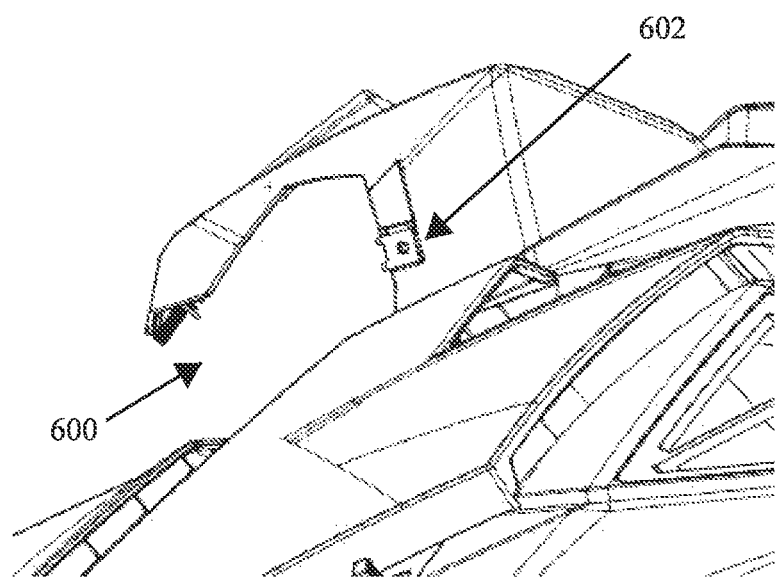
FIGS. 7A-B are views showing an opening configured to receive a headlight assembly, according to some embodiments.
Figure 7B:
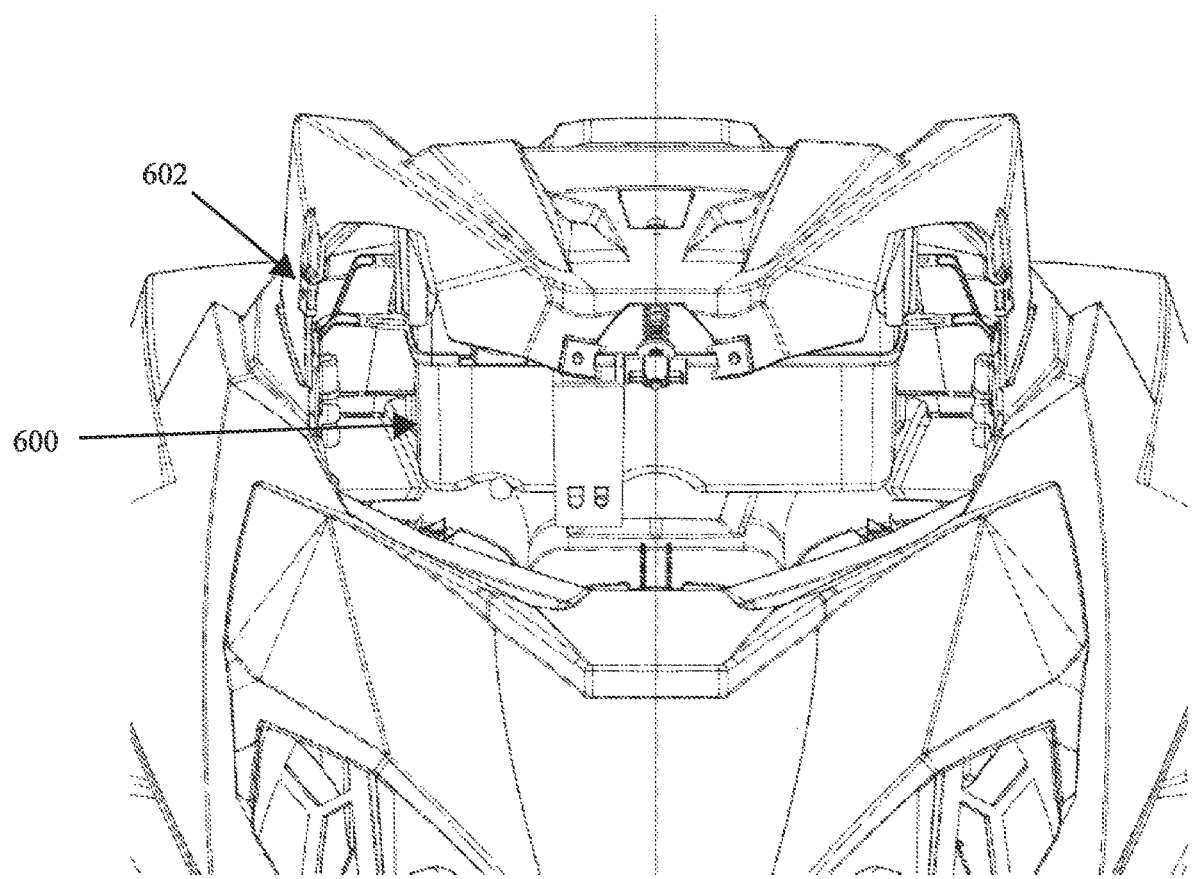
Figure 8A:
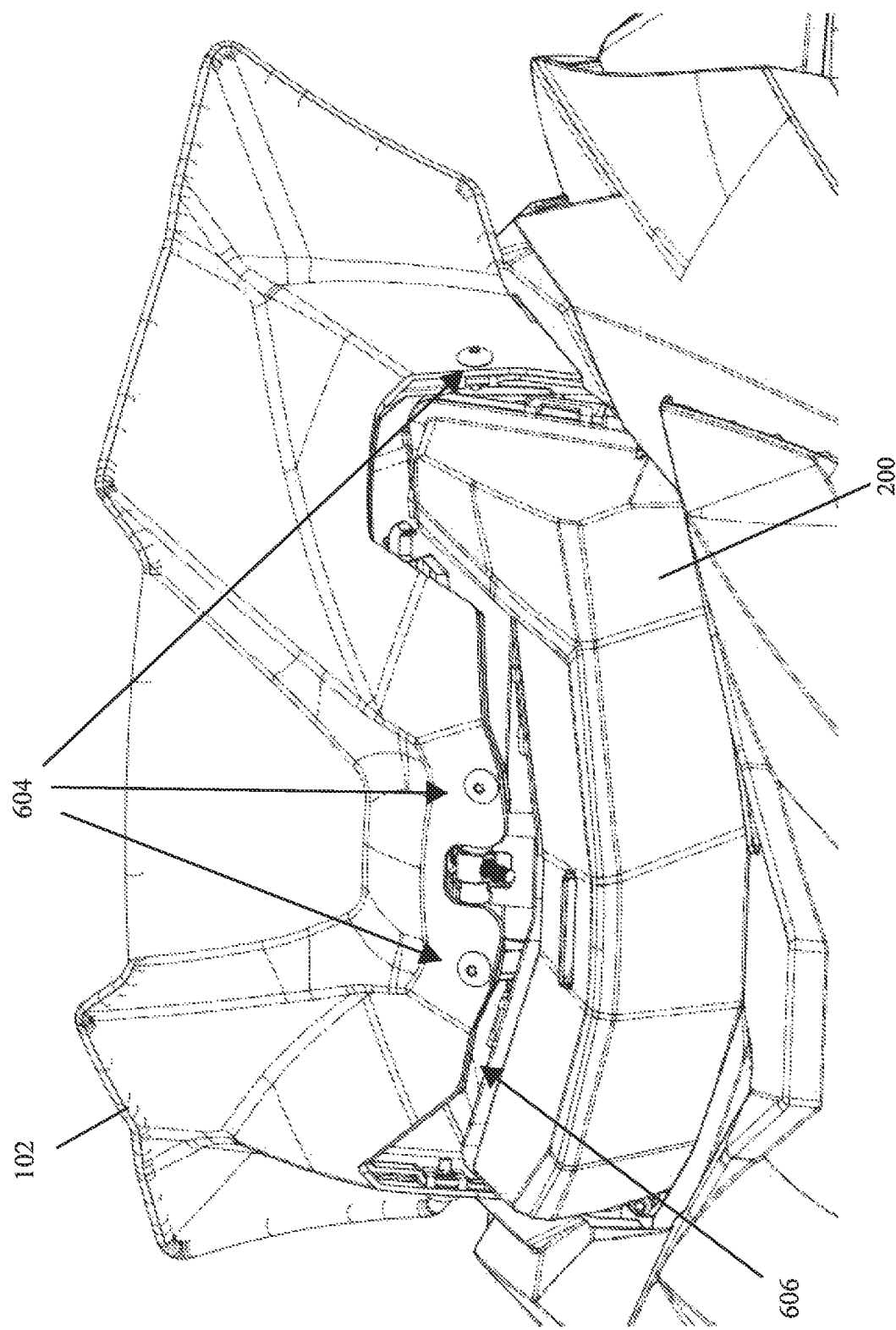
FIGS. 8A-B are views showing attachment of the windshield to the snowmobile, according to some embodiments.
Figure 8B:
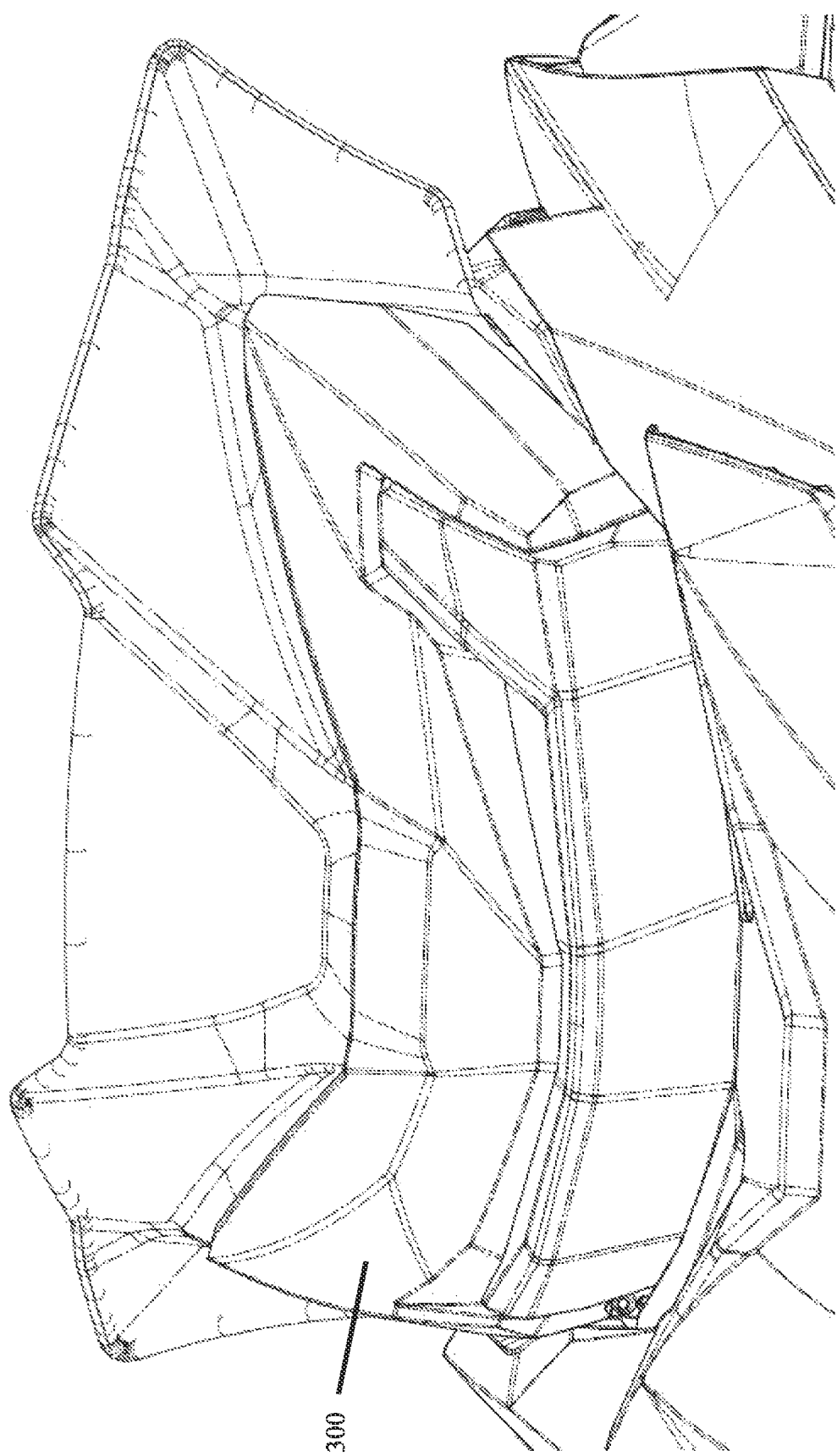

In at least one embodiment, a headlight assembly 104 as shown and described above, with reference to FIGS. 2-5E, is attached to a snowmobile 100. In some embodiments, body 106 of a snowmobile 100 has an opening/space 600 configured to receive the headlight assembly 104 (see e.g., FIGS. 6-7). The headlight assembly 104 may be inserted/replaced as a unit or individually.

In at least one embodiment, the snowmobile 100 includes a windshield 102. FIGS. 6-8B are views showing attachment of an exemplary windshield 102 to a snowmobile body 106. In some embodiments, the snowmobile body 106 has a plurality of windshield attachment locations 602 (see e.g., FIG. 6). In one example, the windshield 102 is attached to the snowmobile body at four locations—two on either side of cradle 236 and one on each side of the windshield 102. Any suitable fastener may be used to attach the windshield 102 to the snowmobile body. In some embodiments, screws 604 are used to attach the windshield 102 to the snowmobile body 106 (see e.g., FIG. 8A). In these embodiments, each screw 604 extends through a hole in the windshield 102 and a hole in the snowmobile body 106. In at least one embodiment, there is a gap 606 between the windshield 102 and the headlight 200 (see e.g., FIGS. 8A-B). In at least one embodiment, the cowl 300 may be removed so that the windshield 102 may be removed and/or attached. In some embodiments, the cowl 300 extends over/covers a portion of the windshield 102 (see e.g., FIG. 8B). For example, the cowl 300 covers the attachment locations 602 and/or a bottom portion of the windshield 102 (see e.g., FIGS. 8A-B).

Figure 9:
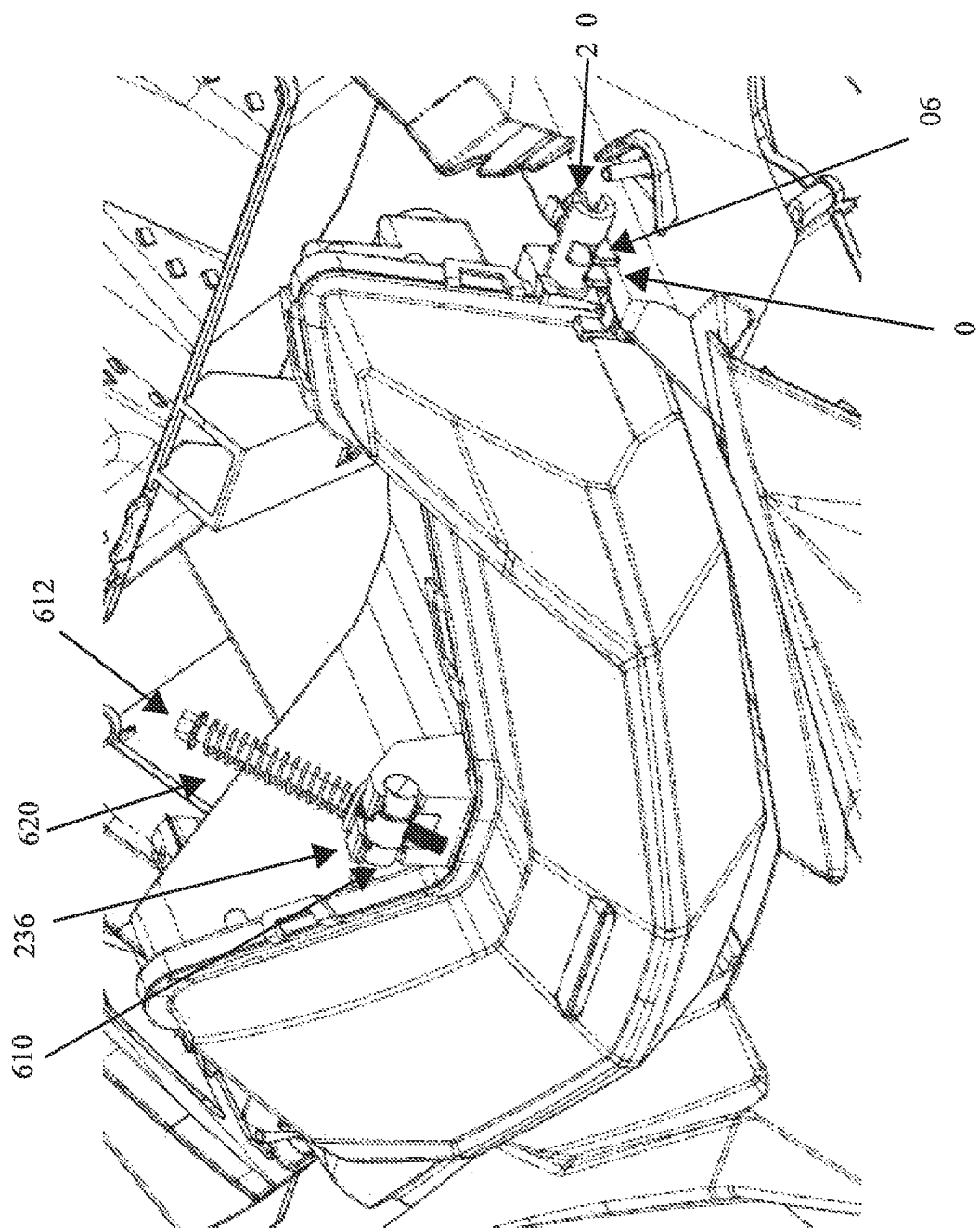
FIG. 9 is a top isometric view of an attachment and adjustment mechanism for the headlight assembly, according to some embodiments.
Figure 10:
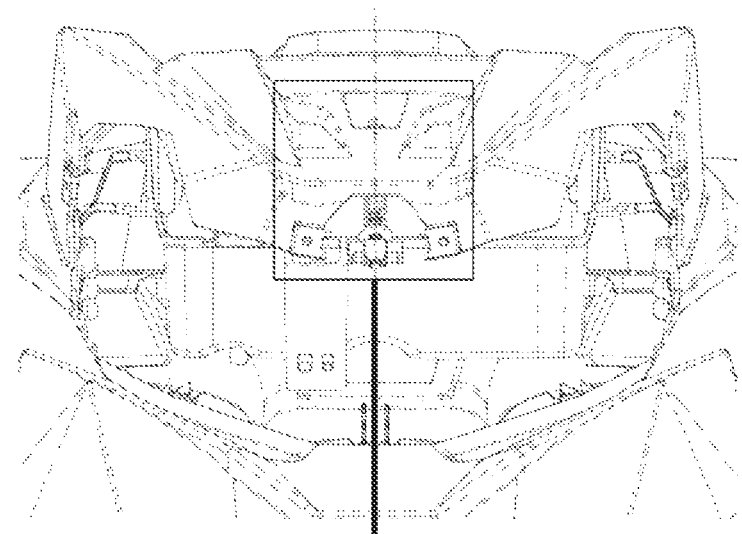
FIG. 10 is a front view of a portion of the snowmobile body with a box surrounding an attachment and adjustment mechanism for a headlight assembly, according to some embodiments.

In at least one embodiment, the headlight assembly 104 further includes an attachment and adjustment mechanism. For brevity, the mechanism will be referred to hereinafter as an adjustment mechanism. In some embodiments, the adjustment mechanism includes a first fastener, a second fastener, and a biasing member. FIG. 6 is an exploded view showing the components of an adjustment mechanism and FIGS. 9-10 are views of an assembled adjustment mechanism, according to some embodiments. In some embodiments, the first fastener is a barrel nut 610, the second fastener is a screw 612, and the biasing member is a spring 620 (see e.g., FIG. 6). The adjustment mechanism may further include a washer 622. In an alternative embodiment, the first fastener is a self-tapping screw nut. In another alternative embodiment, the first fastener is a grommet with a nut. The screw 612 includes a head 614 and a threaded section 616. The screw may further include a non-threaded section 618 positioned between the head 614 and the threaded section 616. In some embodiments, the spring 620 is positioned around screw 612 and extends along the screw from a location adjacent to the screw head 614 to the washer 622 (see e.g., FIGS. 9 and 10A-B). In a further embodiment, the barrel nut 610 is attached to the threaded section 616 of the screw 612 so that the long axis of the barrel nut 610 is perpendicular to the long axis of the screw 612 (see e.g., FIGS. 9 and 10A-B). In additional embodiments, a space in front of cradle 236 is configured to allow the screw 612 to advance in front of cradle 236 (see e.g., FIG. 9).

Figure 10A:
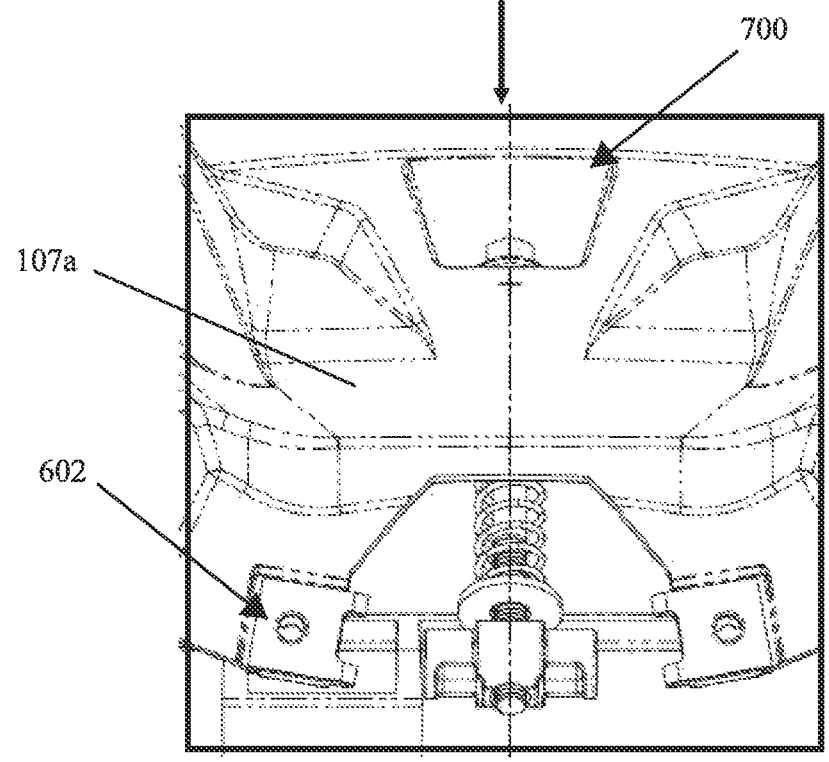
FIGS. 10A-B are an exploded front and isometric front view respectively of the boxed portion of FIG. 10.
Figure 10B:
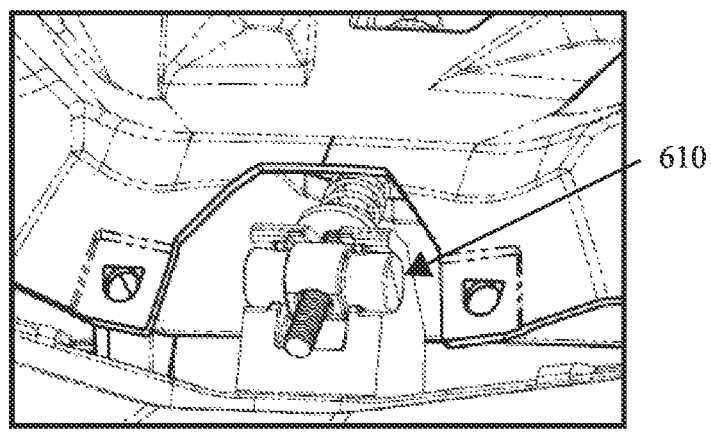

In some embodiments, the adjustment mechanism attaches a headlight assembly 104 to the body. e.g., panel 107a, of a snowmobile 100 and/or pivots the headlight assembly 104. In at least one embodiment, a first end of the adjustment mechanism is positioned in a recess 700 of body panel 107a. The adjustment mechanism extends through a hole in the body panel, and a second end of the adjustment mechanism is positioned in the cradle 236 (see e.g., FIG. 10A). In some embodiments, only one end of the adjustment mechanism is visible and/or accessible. For example, as shown in FIG. 10A, the screw head 614 is visible and accessible in recess 700. Recess 700 is accessible from above the instrument panel and rearward of the headlight. In one preferred embodiment, screw head 614 is adjustable with a Phillips driver. The screw requires small enough torque such that it can be adjusted with a hand driver, such as a screwdriver. In at least one embodiment, the adjustment mechanism may be assembled before the barrel nut 610 is snapped into cradle 236.

Figure 11:
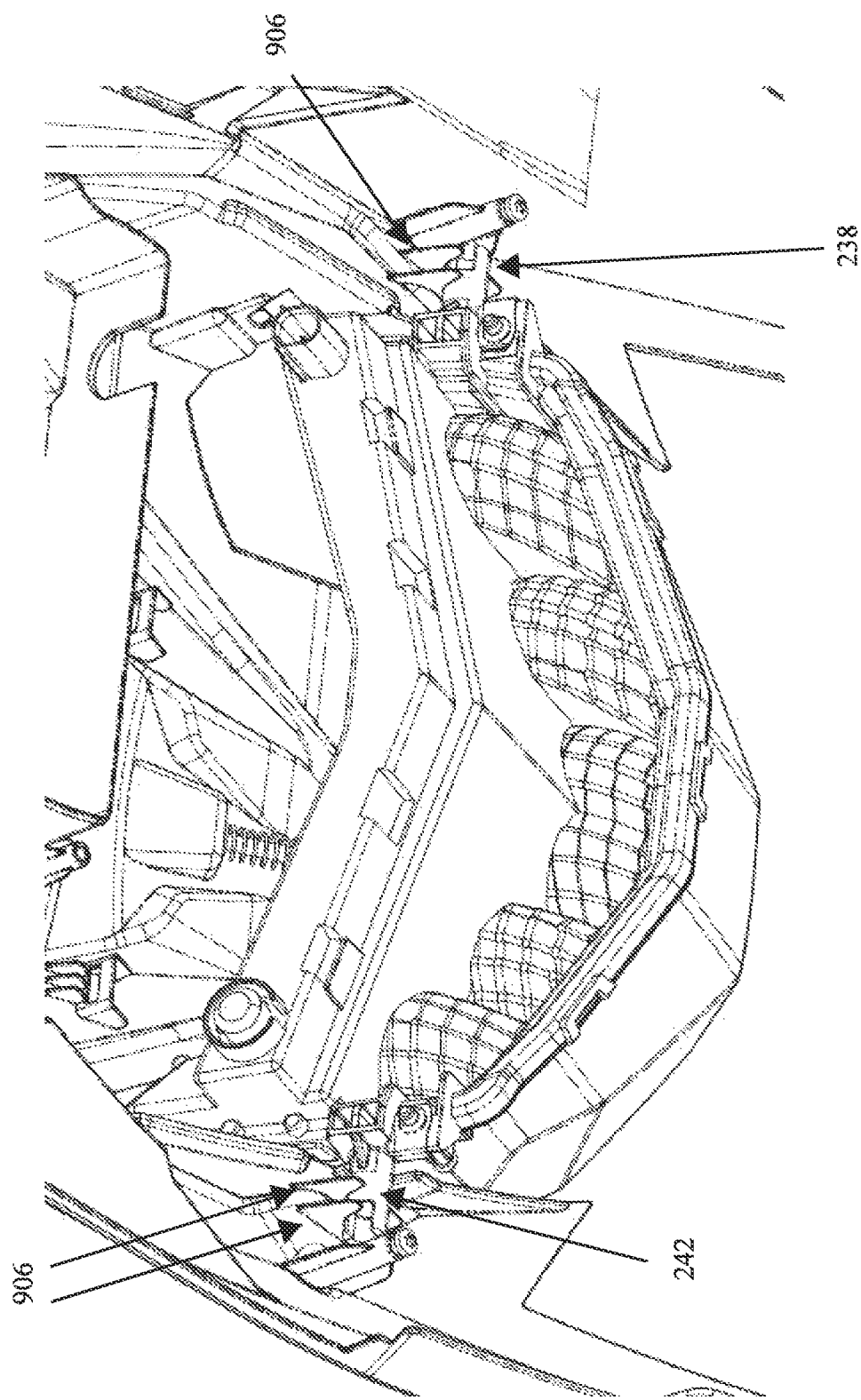
FIG. 11 is an interior view of the snowmobile illustrating the bottom of the headlight assembly with the plenum removed to see an inner portion of the headlight assembly.

FIGS. 9 and FIG. 11 show components of a body panel that are configured to support a pivot shaft 238, 242. In some embodiments, the components include an upper cradle configured to receive an upper portion of the pivot shaft 238, 242 and a lower cradle configured to receive a lower portion of the pivot shaft 238, 242. In one embodiment, the upper cradle and the lower cradle are components of different body panels. In one embodiment, the cradle is formed by a plurality of ribs 906. In this embodiment, each rib 906 includes a semi-circular portion configured to receive the pivot shaft 238, 242. In at least one embodiment, the headlight assembly 104 forms a part of the body of a snowmobile 100 by the components supporting the pivot shafts 238, 240.

In at least one embodiment, when forming a part of a snowmobile body 106, the headlight assembly 104 is adjustable to assume a plurality of positions. The headlight assembly 104 may be adjusted to ±7° relative to a normal position (0°). In some embodiments, the headlight assembly 104 is externally adjustable. In at least one embodiment, the headlight adjustment assembly has three points of adjustment. In one example, the three-point adjustment assembly includes the first pivot shaft 238, the second pivot shaft 240, and the adjustment mechanism with the first fastener, e.g., barrel nut 610, the second fastener, e.g., screw 612, and the biasing member, e.g., spring 620. The headlight assembly 104 may be adjusted by changing the fastener from the first hole 318a on the attachment mount 316 to the second hole 318b (see FIG. 3A) and/or by turning the adjustment mechanism. In at least one embodiment, adjusting screw 612 manipulates the spring tension thereby adjusting the angle of the headlight assembly 104 (see FIGS. 9-11). In some embodiments, the screw 612 is pulled back to adjust the headlight assembly 104 upward. In some embodiments, when the screw 402 is positioned in the first hole 318a, the headlight assembly 104 may be adjusted from −7° to +4° (an 110 range) and when the screw 402 is positioned in the second hole 318b, the headlight assembly 104 may be adjusted from +4° to +7° (a 3° range). See FIGS. 3-4.

Figure 12:
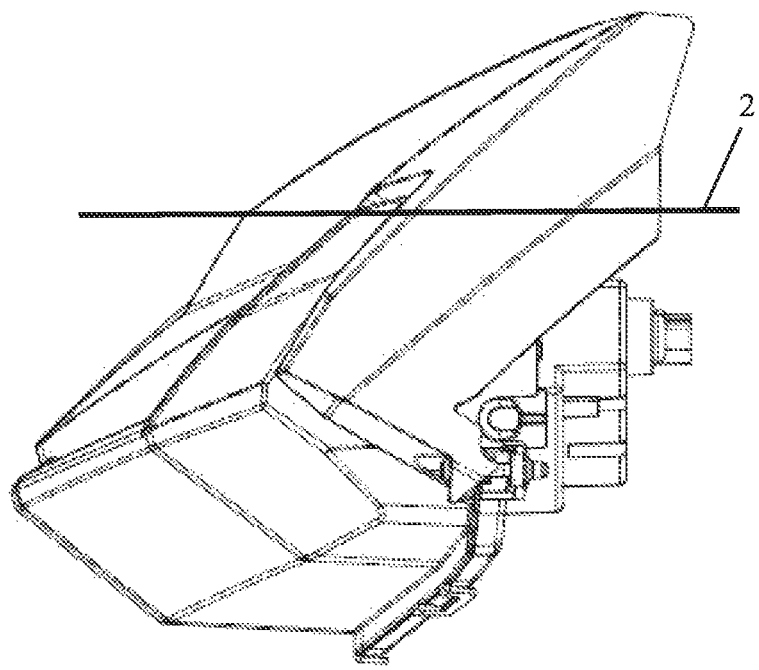
FIG. 12 is a side view of the headlight assembly in a down position, according to some embodiments.
Figure 12A:
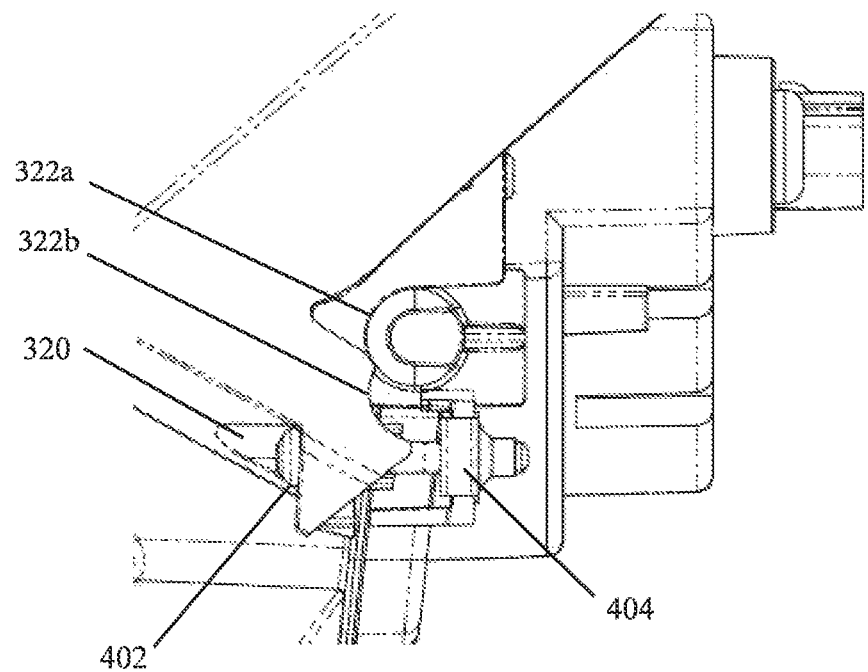
FIG. 12A is an enlarged view of a portion of FIG. 12.
Figure 13:
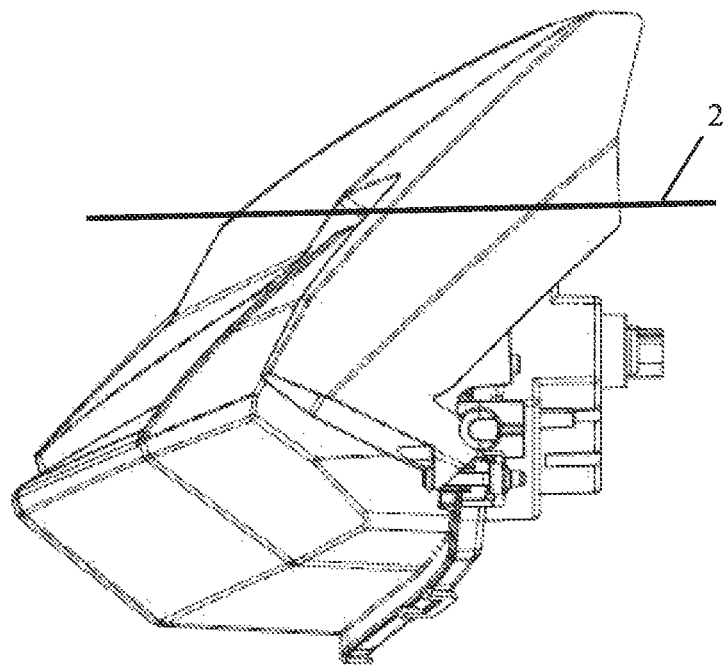
FIG. 13 is a side view of the headlight assembly in an up position, according to some embodiments.
Figure 13A:
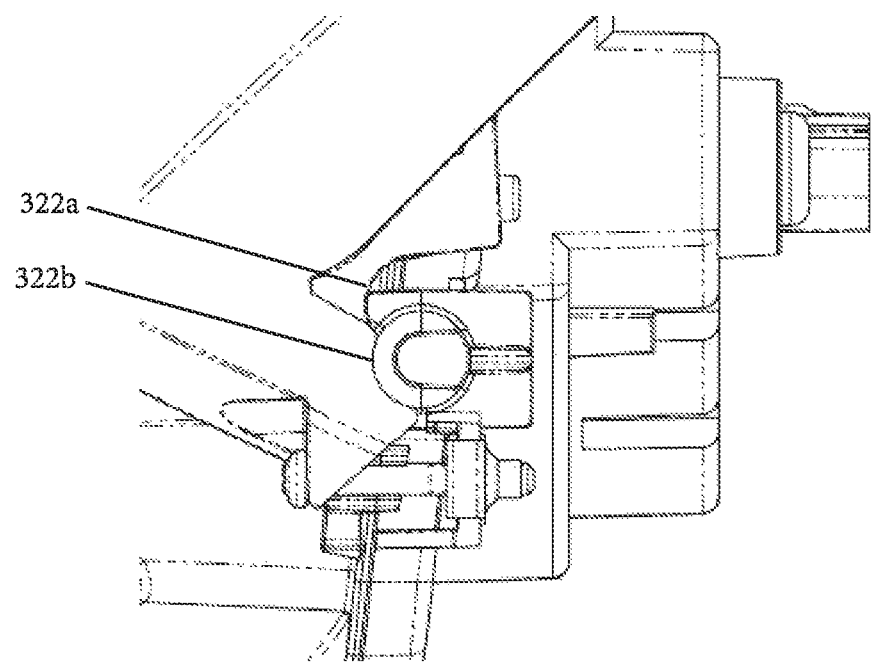
FIG. 13A is an enlarged view of a portion of FIG. 13.

FIGS. 12 and 13 are side views of the headlight assembly 104 in a down and an up position respectively, according to some embodiments. In FIGS. 12 and 13, the down position is −7° and the up position is +7°. FIGS. 12A and 13A are enlarged views of a portion of FIGS. 12 and 13 respectively. A reference line is provided at the same location in FIGS. 12 and 13 to illustrate the relative positions of the cowl 300 and headlight 200 in these two positions. In some embodiments, the cowl 300 is attached to the headlight 200, so that, when the headlight assembly 106 is adjusted, there is no gap between the cowl 300 and headlight 200 at the middle section 308 while the wings 308, 310 may flex and form a gap between the wings 308, 310 and the headlight 200. In further embodiments, when the headlight assembly 104 is adjusted, there is no gap between the trailing edge 304 of the middle section 308 of the cowl 300 and body panel 107a while the wings 308, 310 may flex and form a gap between the wings 308, 310 and the body panel 107a (not shown).

In at least one embodiment, as the headlight 200 pivots the distance between the outer surfaces of the extended portion 234 and the cowl 300 increases (see e.g., FIGS. 12-13). In some embodiments, the pivot shaft 238, 242 is positioned in the first recess 322a in the down position, and in the second recess 322b in the up position (see e.g., FIGS. 12A and 13A). In further embodiments, the fastener 402 is positioned in the first through hole 322a in the down position and the second through hole 322b in the up position.

FIGS. 14-18C illustrate side, front isometric, and cross-sectional views of the headlight 200, or headlight assembly 104, attached to snowmobile 100, in different positions. In FIGS. 14-18C, the down position is −7°, the middle position is +4°, and the up position is +7°. FIGS. 14-18C include a horizontal reference line 2, a vertical reference line 4, and/or an angled reference line 6. A stationary point on the body was selected as one point along the reference line. In FIGS. 14 and 16, the reference lines highlight relative positions of the headlight 200 to the snowmobile body 106 in a down position (A), middle position (B), and an up position (C). In FIGS. 15 and 17, the reference lines highlight relative positions of the headlight assembly 104 in a down position (A), middle position (B), and an up position (C).

Figure 14A:
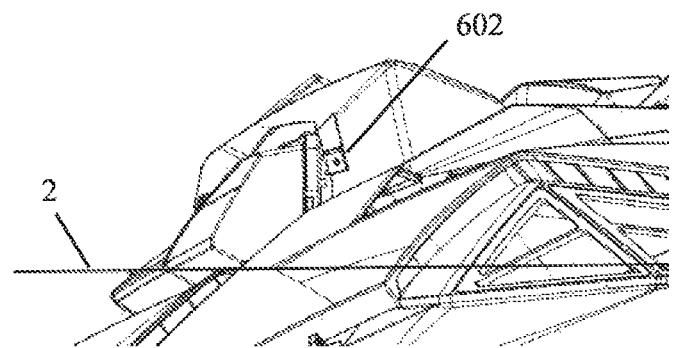
FIGS. 14A-C are side views of the headlight assembly without the cowl, attached to a snowmobile body.
Figure 14B:
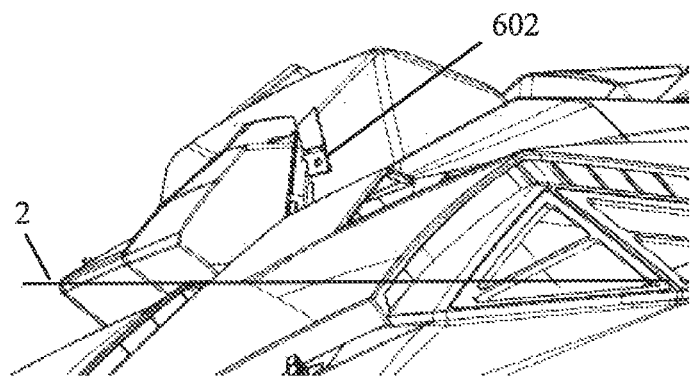
Figure 14C:
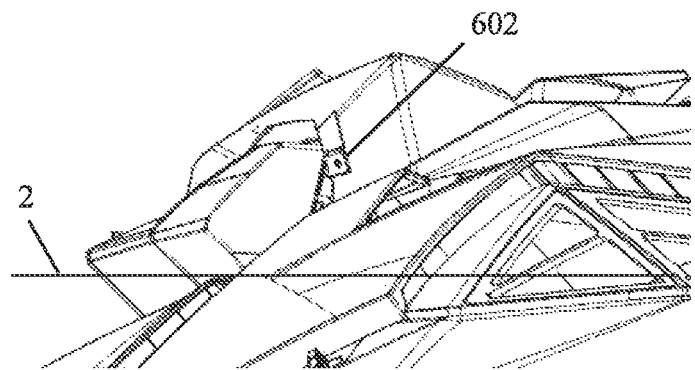

In some embodiments, the headlight 200 pivots as it moves from the down position to the up position so that more of the lower portion 200 of the headlight 104 is visible/exposed when the headlight 200 is in the up position compared to the down position (see e.g., reference lines 2 FIGS. 14A-C and 16A-C). In other words, the exposed area of the lower portion 218 is less in the down position than in the middle position, which is less than in the up position. FIGS. 14A-C also show that the headlight 200 moves relative to the windshield attachment location 602 visible in this view.

Figure 15A:
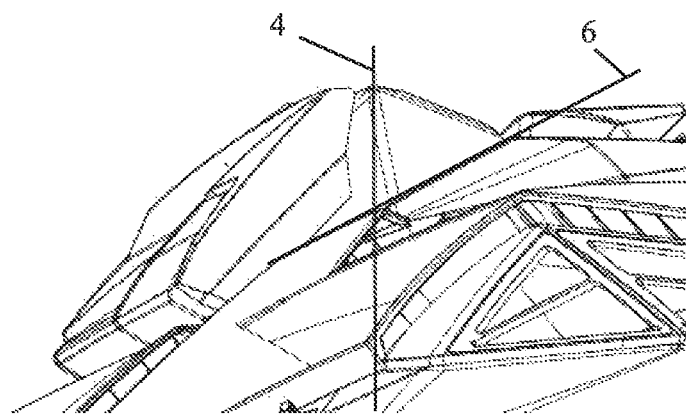
FIGS. 15A-C are side views of the headlight assembly, attached to a snowmobile body, in a down position (FIG. 15A), a middle position (FIG. 15B), and an upper position (FIG. 15C), according to some embodiments.
Figure 15B:
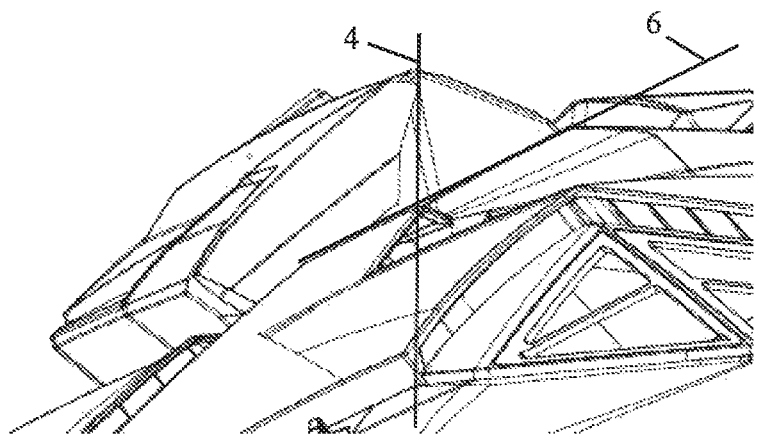
Figure 15C:
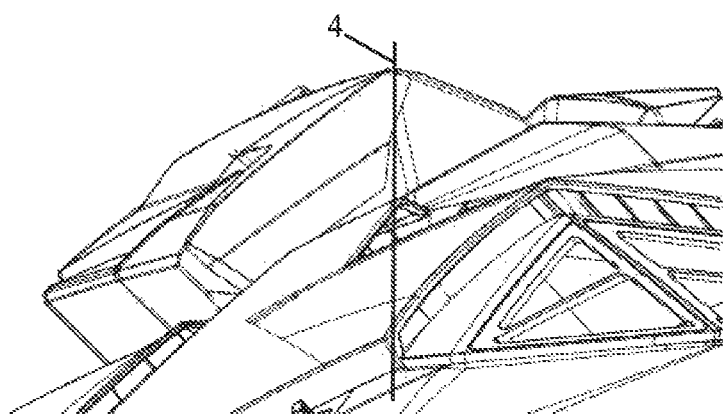
Figure 16A:
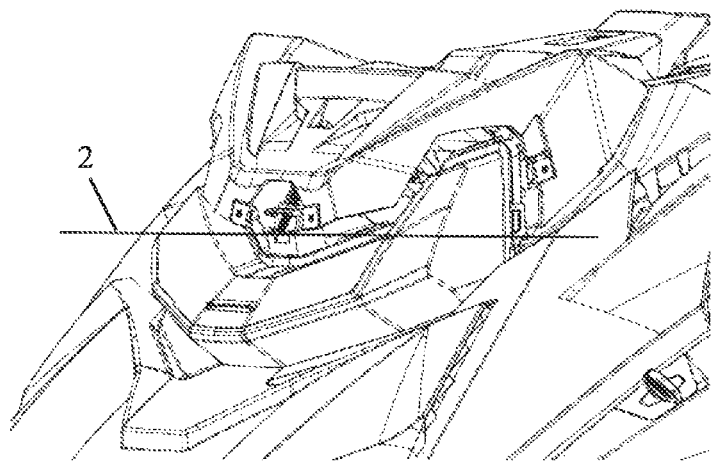
FIGS. 16A-C are front isometric views of the headlight assembly without the cowl, attached to a snowmobile body.
Figure 16B:
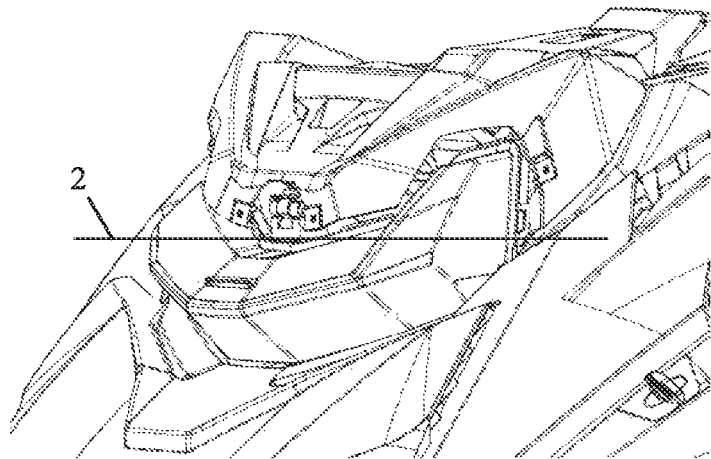
Figure 16C:
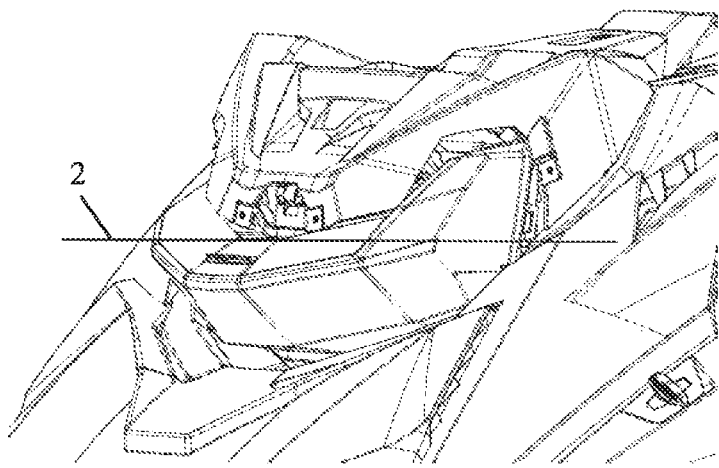
Figure 17A:
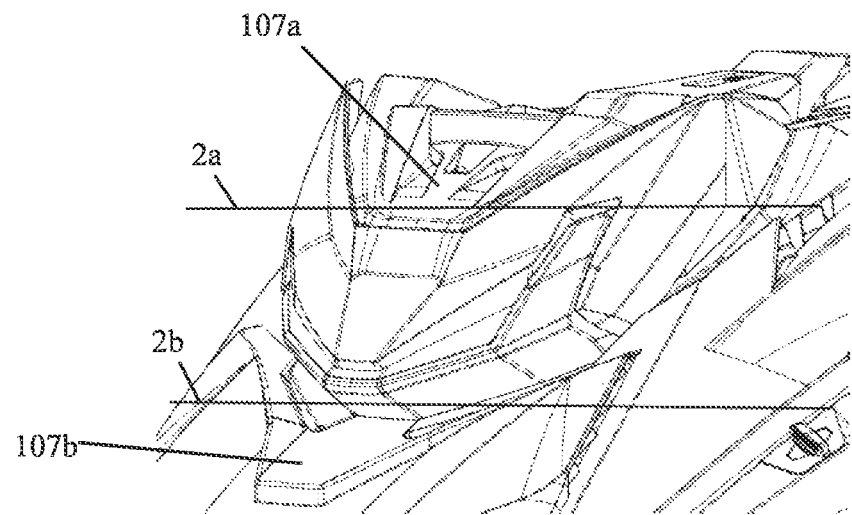
FIGS. 17A-C are front isometric views of the headlight assembly, attached to a snowmobile body, in a down position (FIG. 17A), a middle position (FIG. 17B), and an upper position (FIG. 17C), according to some embodiments.
Figure 17B:
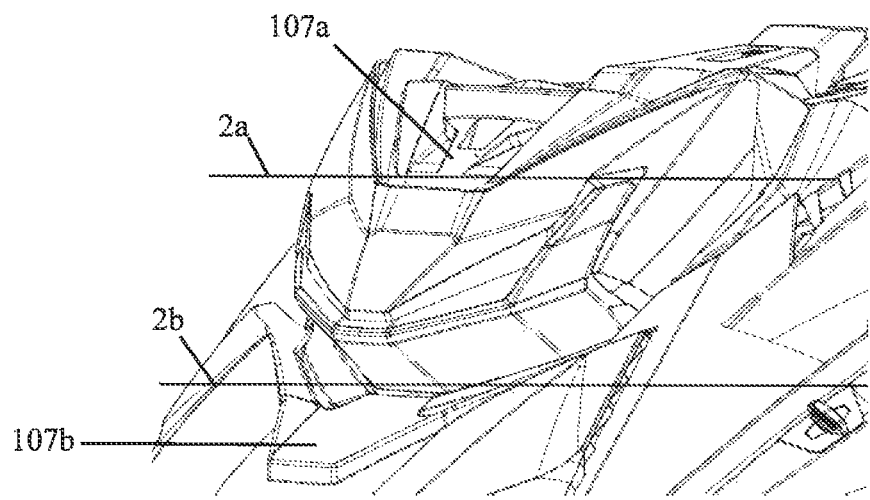
Figure 17C:
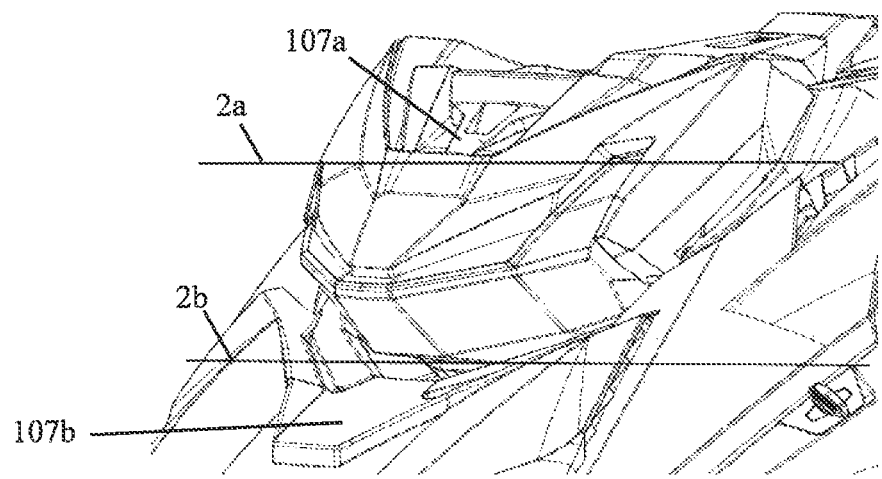

In further embodiments, the cowl 300 moves rearward from the down position to the up position (see e.g., reference lines 4 of FIGS. 15A-C and reference lines 2a/body panel 107a of FIGS. 17A-C). In still further embodiments, an angle of the cowl 300, relative to the snowmobile body 106, changes from the down position to the middle position (see e.g., reference lines 6 FIGS. 15A-C). The cowl flexes as it moves to the uppermost position shown in FIGS. 15C and 17C as can be seen by the change in position of the extended portion 234 of the headlight into the notch 314 of the cowl 30. The upper edges of the cowl slide along the hood or windshield as the cowl elastically flexes as it is moved to this upward extent. Thus, as shown in the figures, a small or no gap is maintained between the cowl and the body 106 of the snowmobile as the headlight assembly 104 and the cowl pivots and slides relative to the body of the snowmobile from a lowest position to a highest position and back.

In some embodiments, there is no gap between the headlight assembly 104 and a front body panel 107 in the down position, a small gap in the middle position, and a larger gap in the up position (see e.g., references lines 2b FIGS. 17A-C).

Figure 18:
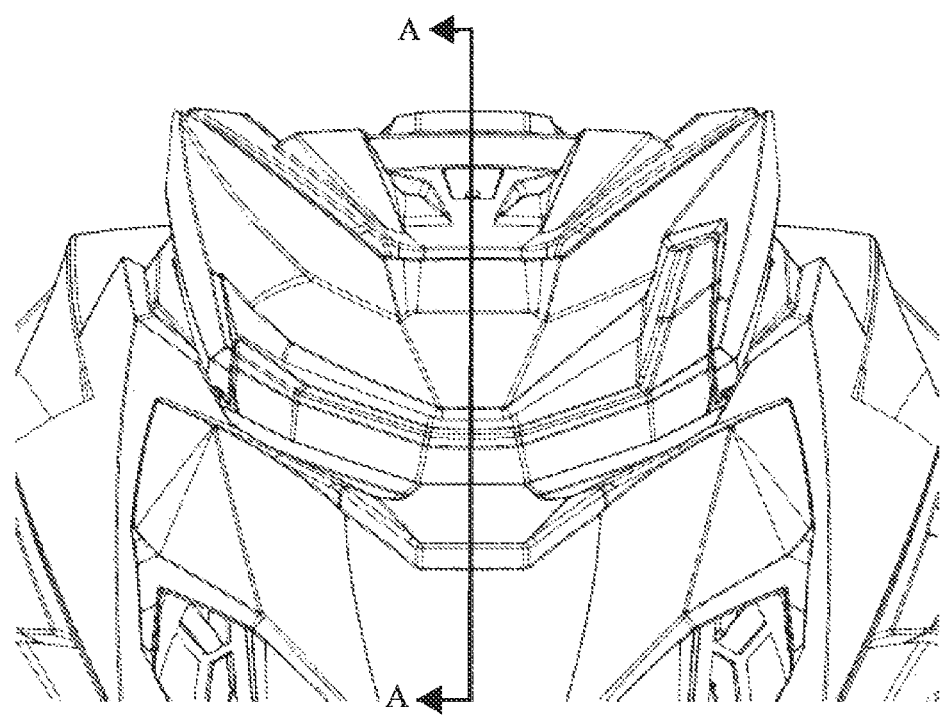
FIG. 18 is a front view of the headlight assembly attached to a snowmobile body.
Figure 18A:
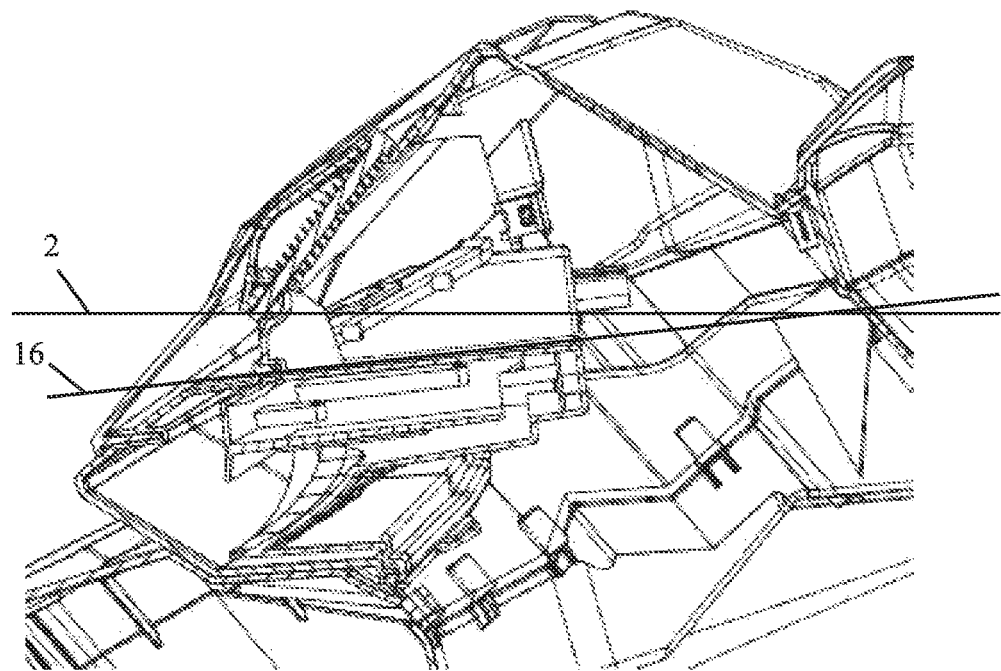
FIGS. 18A-C are cross-sectional views of FIG. 18 taken at line A-A illustrating a down position (FIG. 18A), a middle/neutral position (FIG. 18B), and an upper position (FIG. 18C), according to some embodiments.
Figure 18B:
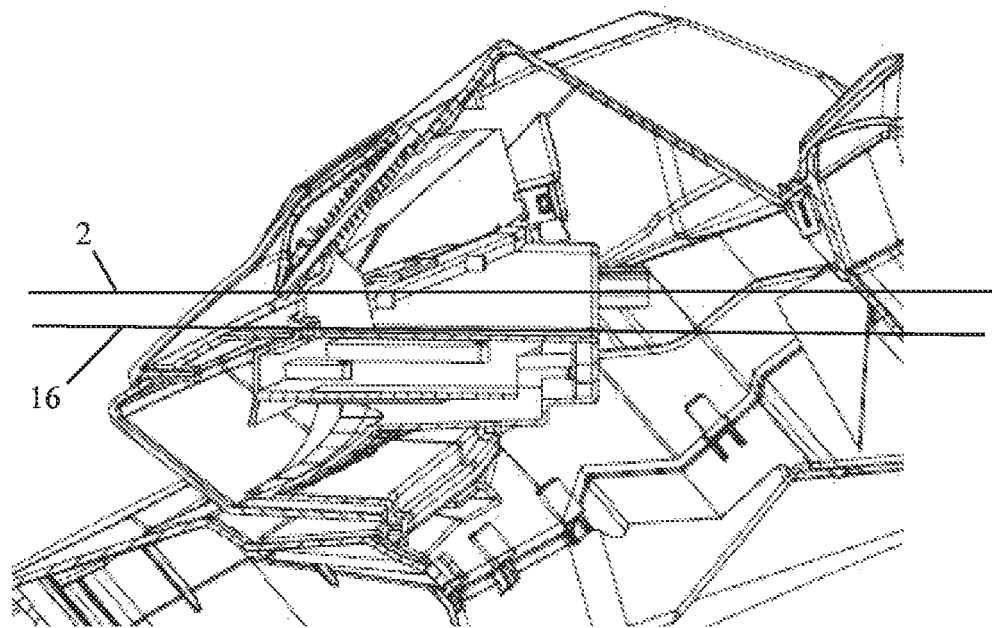
Figure 18C:
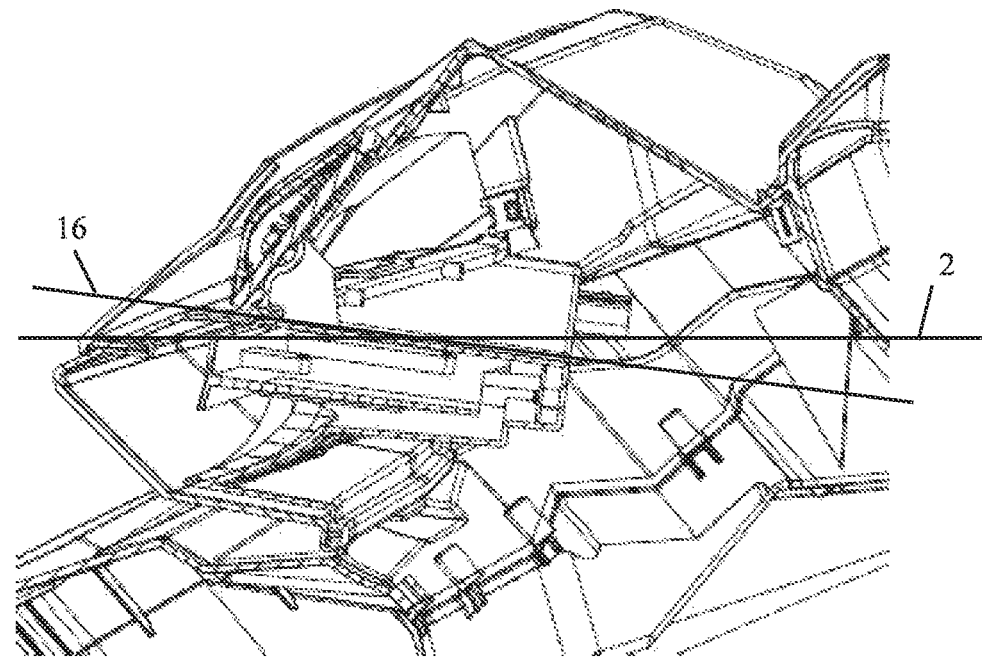

Reference lines 16 in FIGS. 18A-C illustrate the change in the orientation/angle of the headlight assembly 104 in the down, middle, and up positions respectively. In at least one embodiment, the headlight assembly 104 in the down position is oriented at a first angle relative to the horizontal line (FIG. 18A), oriented generally parallel to the horizontal line in the middle position (FIG. 18B), and oriented at a second angle relative to the horizontal line in the up position (FIG. 18C). In some embodiments, the first angle orients the headlight assembly 104 below the normal direction (0°), and the second angle orients the headlight assembly 104 above the normal direction (0°).

In at least one embodiment, when the headlight assembly 104 changes from the down position to the up position, the length of the spring decreases, a distance between the tab 324 and the end of the screw decreases, and/or the barrel nut travels up the screw (see e.g., FIGS. 18A-C). In some embodiments, the spring has a first length when the headlight assembly 104 is in the down position, a second length when the headlight assembly 104 is in the middle position, and a third length when the headlight assembly 104 is in the up position, where the third length<second length<first length. In other words, as the headlight assembly 104 pivots upwards, the spring length decreases. In still further embodiments, the barrel nut is positioned a distance from the end of the screw, where the distance is a first distance when the headlight assembly 104 is in the down position, a second distance when the headlight assembly 104 is in the middle position, and a third distance when the headlight assembly 104 is in the up position, and the first distance<second distance<third distance (see e.g., FIGS. 18A-C). In other words, the barrel nut travels up the screw as the headlight assembly 104 moves from the down position to the up position. In one example, the barrel nut is immediately adjacent to the end of the screw when the headlight assembly 104 is in the down position.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus, the scope of this disclosure should be determined by the appended claims and their legal equivalents. Therefore, it will be appreciated that the scope of the present disclosure fully encompasses other embodiments, which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

Various examples have been described. These and other examples are within the scope of the following claims.

The embodiments of the invention in which an exclusive property or privilege is claimed are defined as follows:

1. A headlight assembly securable to an upper portion of a vehicle including a hood, the headlight assembly comprising:
   a light having a lens and a housing, the light having an upper portion and a lower portion, the light being adjustably securable to the upper portion of the vehicle;
   a cowl having a lower portion and an upper portion, the lower portion secured to the upper portion of said light to move therewith relative to the upper portion of the vehicle, the upper portion of the cowl being slidable relative to the upper portion of the vehicle as it contacts and slides along a portion of the vehicle.

2. The headlight assembly of claim 1, wherein the cowl at least partially covers a gap between the light and the upper portion of the vehicle.

3. The headlight assembly of claim 1 wherein:
   the headlight includes a slot in the upper portion thereof; and
   the cowl includes a tab, wherein when the tab of the cowl is positioned in the headlight slot, the cowl covers an upper portion of the headlight.

4. The headlight assembly of claim 3, the headlight assembly further comprising fasteners connecting the headlight and cowl together, each fastener extending through a hole in a cowl attachment mount and a hole in a tab of the headlight.

5. The headlight assembly of claim 4, the headlight further comprising two pivot shafts, each pivot shaft extending from a side of the headlight and abutting a curved recess in the cowl.

6. The headlight assembly of claim 5, further comprising a cradle configured to hold a headlight adjustment mechanism, the cradle positioned behind the slot.

7. The headlight assembly of claim 1, wherein the headlight is asymmetric about a line bisecting the headlight and the cowl is asymmetric about a line bisecting the cowl.

8. The headlight assembly of claim 7, the headlight further comprising a side section comprising an extended portion, and the cowl further comprising a wing, wherein the wing comprises a notch exposing the upper portion of the extended portion of the side section.

9. The headlight assembly of claim 7, wherein the headlight is L shaped, the cowl is V-shaped, and a middle section of the cowl is positioned over a center section of the headlight, wherein the tab is attached to the middle section and the slot is located in the center section.

10. The headlight assembly of claim 1, wherein the headlight comprises a lens with a V-shaped cross-section, the lens comprising facets extending from a leading edge forming an apex of the V-shaped cross-section.

11. The headlight assembly of claim 1, wherein the cowl is more flexible than the light.

12. The headlight assembly of claim 1, wherein the cowl bears against a portion of the upper portion of the vehicle, the cowl flexing as it bears against the vehicle as a position of the light is adjusted.

* * * * *